US009456253B2

(12) United States Patent
Murphy

(10) Patent No.: US 9,456,253 B2
(45) Date of Patent: Sep. 27, 2016

(54) INTERNET PROTOCOL TELEVISION STREAMING METHODS AND APPARATUS

(71) Applicant: Virtual Marketing Incorporated, Arlington Heights, IL (US)

(72) Inventor: Matthew Steven Murphy, Arlington Heights, IL (US)

(73) Assignee: Virtual Marketing Incorporated, Chicago, IL (US)

( * ) Notice: Subject to any disclaimer, the term of this patent is extended or adjusted under 35 U.S.C. 154(b) by 0 days.

(21) Appl. No.: 13/827,149

(22) Filed: Mar. 14, 2013

(65) Prior Publication Data

US 2014/0157298 A1    Jun. 5, 2014

Related U.S. Application Data

(60) Provisional application No. 61/733,262, filed on Dec. 4, 2012.

(51) Int. Cl.
*H04H 60/32* (2008.01)
*H04N 21/643* (2011.01)
*H04N 21/2347* (2011.01)
*H04N 21/4405* (2011.01)
*H04N 21/222* (2011.01)
*H04N 21/64* (2011.01)

(52) U.S. Cl.
CPC ...... *H04N 21/64322* (2013.01); *H04N 21/222* (2013.01); *H04N 21/2347* (2013.01); *H04N 21/4405* (2013.01); *H04N 21/64* (2013.01)

(58) Field of Classification Search
CPC .......... H04N 21/64322; H04N 21/2347; H04N 21/4405; H04N 21/44204; H04N 21/236; H04N 21/64; H04N 21/222
USPC ............ 725/4, 14, 87, 91, 94, 95, 110
See application file for complete search history.

(56) References Cited

U.S. PATENT DOCUMENTS

| 7,260,598 B1 | 8/2007 | Liskov et al. | |
|---|---|---|---|
| 2007/0061831 A1* | 3/2007 | Savoor et al. | 725/13 |
| 2007/0097639 A1* | 5/2007 | de Heer | H04L 12/5601 361/697 |
| 2009/0013362 A1* | 1/2009 | Liu et al. | 725/110 |

(Continued)

OTHER PUBLICATIONS

International Search Report and Written Opinion issued May 16, 2014 for corresponding Intl. Appln. No. PCT/US13/73083.

*Primary Examiner* — Nnenna Ekpo
(74) *Attorney, Agent, or Firm* — K&L Gates LLP

(57) ABSTRACT

A system, methods, and apparatus for Internet Protocol television streaming are disclosed. An example method includes receiving a request in a content delivery network from a client device to receive television programming from a particular television service provider among a plurality of television service providers. The method also includes allocating for the client device a remote access point in the content delivery network connected to a data feed from the television service provider and a portion of a controller connected to the remote access point configured to encrypt a data stream carrying encoded television service from the television service provider. The method further includes provisioning a secure communication channel between the allocated portion of the controller and a decryption processor connected to the client device and streaming the encrypted data stream carrying the television service from the particular television service provider to the client device via the secure communication channel.

24 Claims, 19 Drawing Sheets

(56) References Cited

U.S. PATENT DOCUMENTS

| | | |
|---|---|---|
| 2009/0172552 A1* | 7/2009 | Segel .......................... 715/733 |
| 2010/0064335 A1 | 3/2010 | Jenkin et al. |
| 2010/0262991 A1* | 10/2010 | Pak et al. ...................... 725/31 |
| 2010/0303071 A1* | 12/2010 | Kotalwar et al. ............ 370/390 |
| 2011/0016225 A1 | 1/2011 | Park et al. |
| 2011/0019632 A1 | 1/2011 | Walker et al. |
| 2011/0197227 A1 | 8/2011 | Rouse et al. |
| 2011/0219109 A1 | 9/2011 | Zehavi et al. |
| 2012/0216225 A1 | 8/2012 | Britt |
| 2012/0272260 A1* | 10/2012 | Casey et al. .................... 725/25 |
| 2013/0091353 A1* | 4/2013 | Zhang et al. ................. 713/156 |
| 2014/0010149 A1* | 1/2014 | Cook .................... H04W 88/08 370/328 |
| 2014/0115325 A1* | 4/2014 | Detienne et al. ............ 713/160 |

\* cited by examiner

| DATA LOG – CONSUMER YFFZG | | | | | | — ☐ ✕ |
|---|---|---|---|---|---|---|
| Programming | Ave. Bandwidth | Description | | Date | Time | Duration |
| Channel YDF | 12 MB | Monday Night Football | | 11/5/2012 | 9:00 PM | 65 Min |
| VoD | 25 MB | Avengers | | 11/6/2012 | 8:30 PM | 170 Min |
| Channel CCB | 10 MB | Animals in Action | | 11/7/2012 | 4:30 PM | 22 Min |
| VoD | 23 MB | Deadwood – Season 2, Episode 3 | | 11/7/2012 | 7:00 PM | 48 Min |
| | | ⋮ | | | | |
| Application | 33 MB | Game – Satellite Blitz | | 11/30/2012 | 8:30 PM | 34 Min |

INTERNET PROTOCOL TELEVISION STREAMING METHODS AND APPARATUS

PRIORITY CLAIM

The present application claims priority to and the benefit of U.S. Provisional Patent Application No. 61/733,262, filed on Dec. 4, 2012, the entirety of which is incorporated herein by reference.

BACKGROUND

Currently, consumers are limited to cable television services based on their geographic location. In the past, cable television service providers received a monopoly for a particular area. In return for receiving the monopoly, a service provider would install cable infrastructure (e.g., receivers, local transmission stations, headends, distribution hubs, transmission lines, repeaters, routers, switches, etc.) throughout the geographic area. More recently, fiber optic television service providers have received geographic monopolies for installing fiber optic television/Internet infrastructure. As a result of these monopolies, consumers in a particular geographic location are limited to the only cable/fiber optic television provider in that area (e.g., Comcast®, Time Warner Cable®, Cox Communications®, Charter Communications®, Cablevision®, Verizon®, AT&T®, etc.).

Recently, television streaming media devices have become available to consumers. These devices enable consumers to stream television service received at their homes to any networked display device. As a result, a consumer can view their television service from any device just as though the consumer was watching the television service at their home. However, consumers are limited to streaming television services that are available at the location where the streaming media device is installed. For instance, a consumer with a streaming media device installed in a residence within Time Warner® territory is limited to streaming Time Warner® television service. There accordingly exists a need to provide consumers with an option to stream television service from any television service provider regardless of where the consumers live.

SUMMARY

The present disclosure provides a new and innovative system, methods, and apparatus for streaming Internet Protocol television. A content delivery network provides a framework for television service providers to provide individual feeds or data streams of television service. The content delivery network separately encrypts each individual stream of television and transmits the streams of television service across respective secure communication paths to corresponding client devices. This configuration enables television service providers to provide television service to any consumer regardless of geographic restrictions while at the same time maintaining a one-to-one correspondence between streams of television service and client devices.

In an example embodiment, a method includes receiving a request in a content delivery network from a client device (e.g., a display device owned by a consumer) to receive television programming from a particular television service provider among a plurality of television service providers. The example method also includes allocating for the client device i) a remote access point in the content delivery network connected to a data feed from the television service provider and ii) a portion of a controller connected to the remote access point configured to encrypt a data stream carrying encoded television service from the television service provider. The example method further includes provisioning a secure communication channel between the allocated portion of the controller and a decryption processor communicatively coupled to the client device and streaming the encrypted data stream carrying the television service from the particular television service provider to the client device via the secure communication channel.

Additional features and advantages of the disclosed system, methods, and apparatus are described in, and will be apparent from, the following Detailed Description and the Figures.

BRIEF DESCRIPTION OF THE FIGURES

FIGS. 8 and 9 are diagrams of data structures including data collected and processed by an example monitoring device of FIGS. 1 and 2.

DETAILED DESCRIPTION

Figure 1:
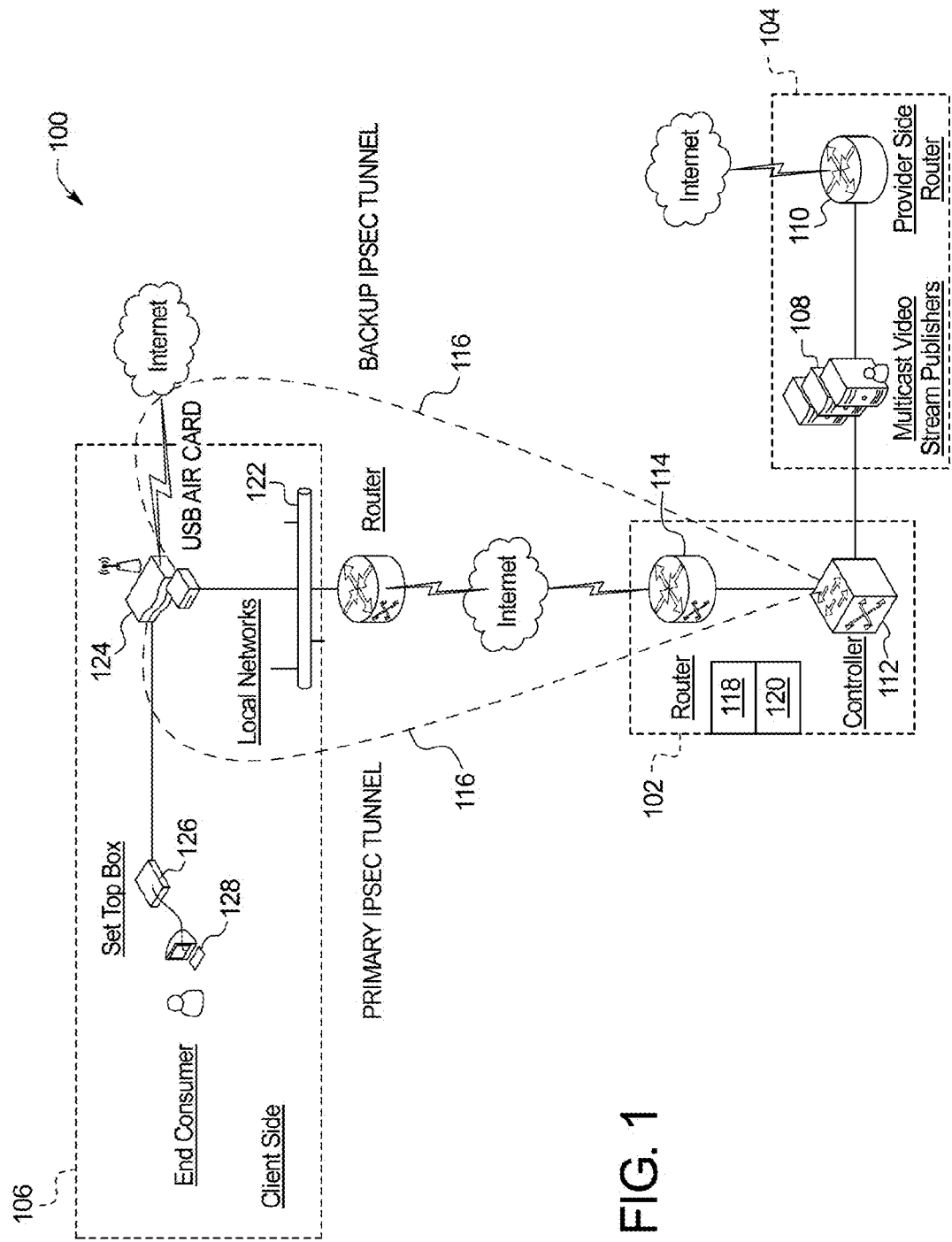
FIGS. 1 and 2 are block diagrams of an example network communication system for television streaming services, according to an example embodiment of the present invention.

The present disclosure relates in general to a method, system, and apparatus to provide Internet Protocol television ("IPTV"), and in particular, to providing streaming IPTV services to consumers regardless of geographic location. Briefly in an example embodiment, a content delivery network is configured to provide carrier-grade and secure IPTV service to virtually any Internet connectable device in the world. The content delivery network is configured to receive television service from a plurality of television service providers, encrypt the television service individually for each subscribing consumer, and individually stream the encrypted service over the Internet as IPTV service to consumer devices.

In some embodiments, a multimedia receiver associated with the selected television service provider is physically sent to a consumer. The receiver decodes television service to enable a consumer device to present or otherwise display the service. In other embodiments, a decoder is transmitted electronically (e.g., as a software application) to a consumer device to enable the device to decode and present the IPTV service. For instance, a consumer may receive (via a software download) a decoder on a tablet computer. The software decoder enables the tablet to present television service without a separate multimedia receiver, thereby saving time and costs of physically sending a receiver to a consumer.

Television service providers are entities (e.g., cable television service providers, satellite television service providers, and fiber optic television service providers) that provide television channel programming, features, movies, applications, and Video on Demand ("VoD"). While television service providers generally provide the same television channels, each provider organizes the channels differently. Further, each provider includes varying amounts of features and movies. For instance, some service providers may include program guides that have content-based search features. Additionally, some service providers may provide proprietary television channels that include exclusive programming or games. Further, some service providers provide applications or widgets that are displayable in conjunction with television programming. Moreover, each service provider has a different VoD library. For instance, some service providers only provide movies from certain distributors while other service providers may provide virtually all movies and television shows.

Some television service providers currently offer IPTV service while others only offer traditional cable television service. In either case, the service providers are limited geographically as to where they can extend their systems. For example, Verizon® can only provide IPTV service to consumers who reside within a geographical area covered by Verizon's phone network. Additionally, in areas where IPTV is unavailable, consumers are limited to either traditional cable television service or satellite television service. The example system, methods, and apparatus described herein eliminate geographical boundaries by providing a distribution network that is capable of streaming television service from any television service provider to any consumer who has a connection to the Internet.

In a traditional cable system or traditional IPTV service, a television service provider provides television program content (e.g., audio, video, data, etc.) to centralized headends. Typically, a service provider provides a headend for each geographical region (e.g., Chicago, Pittsburgh, New York, etc.). The headends combine television programming received from a service provider (typically via a satellite) with local television programming. The headends are also connected to multimedia servers (e.g., publishers) that include libraries of television content (e.g., VoD), application data, program guide information, etc. The headends transmit the combined programming and content/data (collectively referred to as television service) to distribution hubs, which relay the television service to receivers in individual residences. To protect third parties from maliciously acquiring the programming and data, the service providers typically encode the television service at the headends such that only a receiver with a valid key can decode the programming and data.

In traditional cable television systems, service providers provide 'upstream' programming and 'downstream' programming. The downstream programming includes live television programming on many different channels. For instance, a service provider that offers 500 channels transmits all 500 channels from a headend to each consumer. Receivers select (via tuners) the programming for a particular channel, which is then displayed to the consumer. In contrast, upstream programming includes VoD and other applications and features that are requested by a consumer. For instance, a consumer may request to view a particular movie. As a result, a headend only transmits the movie to the requesting consumer, thereby reducing bandwidth usage.

In IPTV systems, service providers provide 'multicast' programming and 'unicast' programming. Multicast programming includes live television programming similar to downstream programming. Similar to downstream programming, the IPTV service providers continuously transmit programming for all of the multicast channels. The main difference between the two is that multicast programming is partitioned into individual channels such that only one channel is transmitted to each consumer based on which channel was requested. Requests to change channels from a consumer causes IPTV routers to change which multicast channel is routed (e.g., streamed) to the consumer.

Unicast programming is similar to upstream programming in that television service (e.g., VoD or data) is transmitted only to the requesting consumer. Consumer requests for unicast programming are typically routed by a headend to designated servers that manage unicast (e.g., upstream) content. The servers transmit requested content or programming back to the requesting individual. This process preserves bandwidth usage because attempting to multicast an entire video library would consume significant transmission resources.

The upstream or unicast programming requires that each consumer is assigned a dedicated communication path from the consumer's receiver to a headend. Oftentimes, the dedicated communication path is a combination of physical wires and logical communication paths over a high capacity data bus. In IPTV, the communication path includes Internet infrastructure (e.g., routers, switches, etc.). Headends are connected to distribution hubs via high capacity buses. In traditional cable systems, the distribution hubs are typically connected to a household television receiver via a dedicated physical cable (e.g., fiber optic or coaxial). The distribution hubs use address translation to ensure that programming and data received over the high capacity bus is routed to the correct physical cable. The result of a dedicated logical and/or physical communication path is a one-to-one correspondence between consumers and television service providers at headends.

While some people are generally satisfied with the television service offered by a local provider, there are others who desire (or are required) to receive television service from a particular specific provider. For example, retail stores or traveling exhibits provide demonstrations of a particular television service provider. These stores or exhibits require that the service displayed to consumers is actually received from that service provider. However, if the retail store or exhibit is located in an area covered by a different service provider, the retail store has to establish a costly separate physical connection to a distribution station of the service provider.

In another example, a chain of retail stores or restaurants may have a collective subscription with a television service provider to provide television service throughout the chain. However, some stores or restaurants may be located in areas covered by different service providers, which would require many different service contracts. Additionally, the varying television services provided in the same chain of stores or restaurants may be counter to the principle of maintaining uniformity between the different locations.

In another example, a consumer may have a strong desire to watch programming on a particular channel (e.g., the Big Ten Network). However, this channel may only carried by some television service providers. If the consumer moves to Arizona or California where the local television service providers do not provide the desired channel, the consumer will not be able to watch this channel anymore.

In a further example, a consumer may want to preview different television service providers. Currently, a consumer is limited by geographical location to IPTV, cable, and satellite television providers in the area. Thus, if the consumer wants to sample a cable television service but no cable service to the consumer's residence exists, the consumer has to install cable infrastructure to receive the service. Alternatively, a consumer that wants to sample a satellite television service has to install a satellite dish and corresponding cabling.

In yet a further example, some consumers may not be in range of cable television service. Instead, these consumers may have a wireless Internet connection. However, there may not be an IPTV service provider in that geographic area. In these situations, the consumers are limited only to satellite television service providers.

The disclosed content delivery network solves at least the above mentioned issues by centralizing the distribution of television service such that any consumer with an Internet connection can receive television service from any service provider while at the same time maintaining a one-to-one correspondence between consumers and service providers. To provide a centralized distribution of television service, the content delivery network includes controllers that receive encoded television service (e.g., unicast, multicast, upstream, downstream programming) from television service providers. The controllers receive the television service via IPTV connections (e.g., an Internet connection), fiber optic television connections, coaxial cable connections, or satellite receiver connections. The type of connection is based on the capability of the television service provider and the physical distance between the controllers and the distribution network of the service providers. For instance, a controller must be located relatively close to a headend of a television service provider that only distributes television service via coaxial cables. However, in instances where a service provider supports IPTV distribution, the controllers may be located any distance from the service provider because the television service is provided over the Internet.

Upon receiving encoded television service from a television service provider, the example controllers encrypt and transmit the service to consumers via separate dedicated secure communication channels. In some embodiments, a secure communication channel includes a permanent virtual circuit ("PVC"), a secure virtual circuit, a stream control transmission protocol ("SCTP") connection, or a virtual private network ("VPN"). The controllers establish a separate secure communication channel for each consumer to maintain a one-to-one correspondence between consumers and television service providers. The result of this configuration is that a consumer with an Internet connection can receive television service from any television service provider that provides television service to the example content delivery network regardless of the geographic restrictions of the service providers.

Throughout this disclosure, reference is made to a VPN path as a secure communication channel between a consumer and a content delivery network. However, it should be appreciated that in other embodiments, other types of secure paths or tunnels may be used including, for example, PVC or SCTP. The use of secure communication paths preserves quality of service ("QoS") parameters for television viewing while preventing malicious third parties from interfering with transmitted television service. The secure communication paths also enable efficient bi-directional data transmission to facilitate communication between consumer multimedia receivers and headends, which cause the content delivery network to appear invisible to consumers. This bi-directional data transmission also enables receivers to send requests to headends for upstream, unicast, or multicast programming.

As disclosed herein, the content delivery network is a network of controllers (e.g., servers or processors), routers and/or remote access points that route individual data feeds of television service to subscribing consumers. In some embodiments, the content delivery network includes a logical or physical remote access point for each client network that receives service. The content delivery network provides this one-to-one correspondence by having separate communication paths between the controllers/routers/remote access points and the television service providers. For instance, a television service provider may connect 100 separate coaxial cables (or fiber optic lines) to 100 separate remote access points for 100 subscribing consumers. Additionally or alternatively, a television service provider may assign 100 separate IP addresses to the 100 remote access points to provide 100 separate communication paths of IPTV service. Further, the content delivery network may partition a controller into 100 separate logical portions corresponding to the respective 100 subscribing consumers to maintain a one-to-one correspondence. Each portion of the controller encrypts television service and functions as a VPN endpoint for a respective consumer.

For each communication path or data link (e.g., coaxial cable), the controller establishes a respective VPN with a consumer. The controller associates a VPN path with a remote access point (e.g., interface port or gateway) that receives television service from a service provider. As a result, television service received via an assigned port of a remote access point is automatically forwarded through the content delivery network to the corresponding VPN path to maintain a one-to-one correspondence between consumers and service providers. The VPN path may only be instantiated for as long as a receiver is powered or as provided by a controller. In other embodiments, the VPN path may be relatively permanent regardless of the activity of a receiver.

As disclosed herein, the controllers encrypt television service prior to transmitting the service over a VPN path. The encryption is over the encoding of the television service provided by the service providers and requires a decryption processor to decrypt the service at the consumer side (e.g., a client network) prior to a television receiver being able to decode the programming for display. In some instances, the decryption processors are standalone devices physically provided by an operator of the content delivery network. In other instances, the decryption processors may be software installed in a multimedia receiver (e.g., a television receiver or set-top box), a gateway, computer, smartphone, or tablet computer located at the consumer side.

A multimedia receiver decodes the television programming prior to display. A consumer that requests to have a particular service from a service provider has to physically possess a receiver. The receiver may be provided by the service provider or, alternatively, an operator of the content delivery network.

In an embodiment, a content delivery network is configured with an array of remote access points connected to one or more controllers. The remote access points are connected to different television service providers. In an initial configuration, the remote access points can be provided with a number of inputs from each service provider based on estimated consumer demand. For instance, a manager of the content delivery network may establish 100 separate channels or data feeds to respective remote access points from a first television service provide and establish 500 separate data feeds from a second television service provider. Each channel or data feed of a remote access point corresponds to a separate communication path from a service provider to the content delivery network. While the remote access points are physically connected to the service providers, the service providers may not provide television service for each data feed or channel until a consumer subscribes to that channel. This pre-configuration enables the content delivery network to provide a consumer service relatively quickly without having to establish a new connection in response to a request for service.

To establish an IPTV connection for a consumer, the content delivery network receives a subscription request from the consumer. The subscription request includes a request to receive television service from a particular television service provider. It should be appreciated that in alternative embodiments a consumer provides a request to a television service provider, which in turn transmits the request to the content delivery network. In response to the subscription request, an operator of the content delivery network physically sends the consumer a decryption processor and a television receiver corresponding to the requested service provider. For example, the operator sends a consumer a Timer Warner® compatible receiver and a decryption processor in response to a request for Time Warner® service. The content delivery network also assigns to the consumer a data feed or channel from the requested service provider to a remote access point and provisions a portion of a controller. After receiving the television receiver and decryption processor, the consumer connects the decryption processor to a gateway or local network owned or managed by the consumer. The consumer then connects the television receiver to the decryption processor.

Upon being connected to the Internet, the decryption processor sends a request to the content delivery network to establish a VPN. The request can include a serial number, a media access control ("MAC") address of the decryption processor, a code or key assigned to the decryption processor, and/or an IP address of the decryption processor. In response to the request, the content delivery network establishes a VPN path from at least one of the controllers to the decryption processor. The content delivery network also logically connects the controller to a remote access point assigned to the consumer. At this point, the consumer can receive IPTV service originated by a television service provider and streamed by the content delivery network.

In addition to providing IPTV services, the example content delivery network also monitors television service usage. The monitored usage can be provided to television service providers reporting how consumers use their television service. Additionally or alternatively, the monitored television service usage can be compiled into reports for third parties such as, for example, marketing companies, product manufacturers, advertisers, media, consumer groups, etc. The monitored data can include, for example, bandwidth usage, upstream programming requests, demographic matching and/or geographic matching between consumers and television service providers, etc.

The disclosed system may be readily realized in a network communications system. A high level block diagram of an example network communication system 100 is illustrated in FIG. 1. The illustrated system 100 includes a content delivery network 102, a television service provider network 104, and a client network 106. The illustrated system 100 shows high level connectivity between the three networks 102, 104, and 106. It should be appreciated that in other embodiments, the content delivery network 102 may be connected to a plurality of client networks 106 and a plurality of service provider networks 104.

The television service provider network 104 includes hardware, software, and infrastructure for generating and routing television service. This includes multicast video stream publishers 108 and provider routers 110. The multicast video stream publishers 108 provide encoded television service to the content delivery network 102 via the Internet or through cable connections. The encoded television service can include television programming, applications, VoD, widgets, functions, features, etc. In the embodiment shown in FIG. 1, the publishers 108 transmit the television service to the content delivery network 102. The publishers 108 also transmit the television service to subscribers (via the routers 110 and the Internet) in a geographical location covered by the publishers. While the video stream publisher 108 shown in FIG. 1 is configured to provide unicast and multicast IPTV service, in other embodiments the publisher 108 can provide upstream programming and/or downstream programming.

As shown in FIG. 1, the publishers 108 are directly connected to the content delivery network 102. However, in alternative embodiments, the publishers 108 may connect to the network 102 via the Internet. In either embodiment, the publishers 108 provide a separate communication path (either logical or physical) for each subscribing consumer.

The example content delivery network 102 of FIG. 1 includes one or more controllers 112 and one or more routers 114. The controllers 112 may be located in a centralized location or may be distributed across a geographic area (e.g., implemented in a cloud computing framework). The controllers 112 include physical interfaces (e.g., remote access points or gateways) to receive television service from the publishers 108. The remote access points can include an Internet connection (e.g., an Ethernet connection), a coaxial cable connection, a fiber optic connection, or a satellite connection. As disclosed herein, the remote access points provide line termination points for the television service providers at the content delivery network 102.

In addition to physical/logical interfaces, the controllers 112 include functionality for encrypting encoded television service provided by the publishers 108. The controllers 112 are partitioned such that a logical (or physical portion of a controller) is designated for a particular consumer to preserve a one-to-one correspondence. Each partitioned portion of a controller 112 is connected (via switches and routers) to the appropriate remote access point. Each partitioned portion of a controller 112 is also connected to an appropriate client network 106 via a VPN path 116 (e.g., primary and backup IP security ("IPSEC") tunnel).

A network manager 118 of the content delivery network 102 establishes the VPN path 116 path for each partitioned portion of a controller 112. The network manager 118 also establishes the VPN path 116 path across the router 114 and through the Internet to the client network 106. In instances where the controllers 112 are distributed across different physical areas, the network manager 118 also determines which controllers 112 are to be connected to which client networks 106 and which publishers 108.

The content delivery network 102 also includes a monitoring device 120 configured to collect television service usage data. The monitor 120 may measure, for example, bandwidth usage of particular consumers (or groups of consumers), VoD usage, television programming/channel viewing information, or any other information capable of being monitored. The monitoring device 120 may also associate consumer information with the monitored data. Further, the monitoring device 120 may prepare reports summarizing the monitored data in conjunction with general consumer demographic and/or geographic information. In some embodiments, the monitoring device 120 may include an application programmable interface ("API") that enables publishers 108 (e.g., television service providers) or third parties to create their own reports based on collected data.

The controllers 112, network manager 118, and/or monitoring device 120 may include or be supported by, for example, Cisco® 65xx model cores and Cisco® Nexus gear. Routing within the controllers 112 and/or the routers 114 may be provided by, for example, Cisco® 85xx cores or applicable Brocade® switch equipment. The controllers 112 may be implemented by, for example Mobility Controllers provided by Aruba Networks®. Load balancing of IPTV streaming service among the controllers 112 may be implemented by F5C® tunnel load balancing equipment.

As shown in FIG. 1, the VPN path 116 is connected to the client network 106, which includes a local network 122, a decryption processor 124, a television receiver 126 (e.g., a set top box), and a display device 128. In other embodiments, the client network 106 can include fewer or additional components. For instance, the local network 122 could be replaced with a gateway.

The example local network 122 of the current embodiment includes routers, firewalls, switches, gateways, access points, repeaters, etc. to establish a local area network ("LAN") at the consumer site. The local network 122 may also include wireless transceivers to form a wireless LAN ("WLAN"). The local network 122 is connected to the content delivery network 102 via the Internet. While the local network 122 is shown as only being connected internally to the decryption processor 124, the local network 122 may also be connected to client-side servers, processors, laptops, tablet computers, smartphones, etc.

The decryption processor 124 is a device that decrypts encrypted television service. The decryption processor 124 is connected in-line with the receiver 126 such that television service is first decrypted prior to being decoded by the receiver 126. While FIG. 1 shows the decryption processor 124 as a physical hardware device, in other examples the decryption processor 124 may be implemented by software installed in the receiver 126 or a computer connected to the receiver 126.

As shown in FIG. 1, the VPN path 116 extends from the partitioned portion of the controller 112 to the decryption processor 124. To create the VPN path 116, the decryption processor 124 transmits identification information to the controller 112 upon being connected to the local network 122. The identification information can include an IP address of the local network 122, an IP address or MAC address of the decryption processor 124, or an identifier assigned to the decryption processor 124 by the network manager 118. The network manager 118 uses the identification information to establish a termination point or endpoint (e.g., destination address) of the VPN path 116.

Also shown in FIG. 1, the decryption processor 124 decrypts television service received via wired and wireless portions of the VPN path 116. For instance, the decryption processor 124 may receive television service from the content delivery network 102 primarily via wired Internet connections. However, the decryption processor 124 and/or the local network 122 may include functionality that enables the VPN path 116 to be extended to wireless networks (e.g., 4G LTE or WiFi). This extension provides a secondary or backup route to stream IPTV service in the event the primary route becomes broken or congested. In some embodiments, the client network 106 may only have a wireless connection to the Internet. In these embodiments, the decryption processor 124 receives IPTV service from the content delivery network 102 primarily through wireless channels.

In alternative embodiments, the decryption processor 124 receives wireless IPTV service as a primary route. For instance, the decryption processor 124 can be combined with the receiver 126 and the display device 128 as a mobile device (see FIGS. 15 to 17). A consumer could use the mobile device to receive and display IPTV service from any remote location where a physical Internet connection (and/or centralized power source) is unavailable. For example, wireless IPTV service can be used by sales personnel of television service providers for sales presentations, door-to-door sales, and/or centralized remote presentations (e.g., a presentation provided by a mobile demonstration vehicle at public events/trade shows). Additionally, the wireless IPTV service can be used by individual consumers for boating, tail-gating, camping, etc.

The example decryption processor 124 may be implemented by hardware devices provided by Aruba Networks. The decryption processor 124 may support lossless data compression for IPTV services provided over relatively slower networks. In one configuration, the decryption processor 124 boots and exchanges IKE key and encryption parameters with a predefined host server address in the controller 112 and/or network manager 118. In response, the controller 112 or the network manager 118 transmits configuration information to the decryption processor 124 to establish the VPN path 116.

As discussed above, the receiver 126 receives decrypted television service from the decryption processor 124. The example receiver 126 decodes the television service for display on the display device 128. The display device 128 includes any device capable of displaying television service including, for example, televisions, computer displays, laptops, tablet computers, smartphones, etc.

The receiver 126 of FIG. 1 also functions as a tuner to select/request a television channel and a multimedia player for requesting and processing VoD, applications, widgets, features, and functions supported by the appropriate publisher 108. For instance, the receiver 126 transmits messages through the VPN path 116 to the content delivery network 102, which are then transmitted to the appropriate publisher 108 by the controller 112. In response to the messages, the publisher 108 provides television service, which is routed by the controller 112 over the VPN path 116 to the receiver 126.

Figure 2:
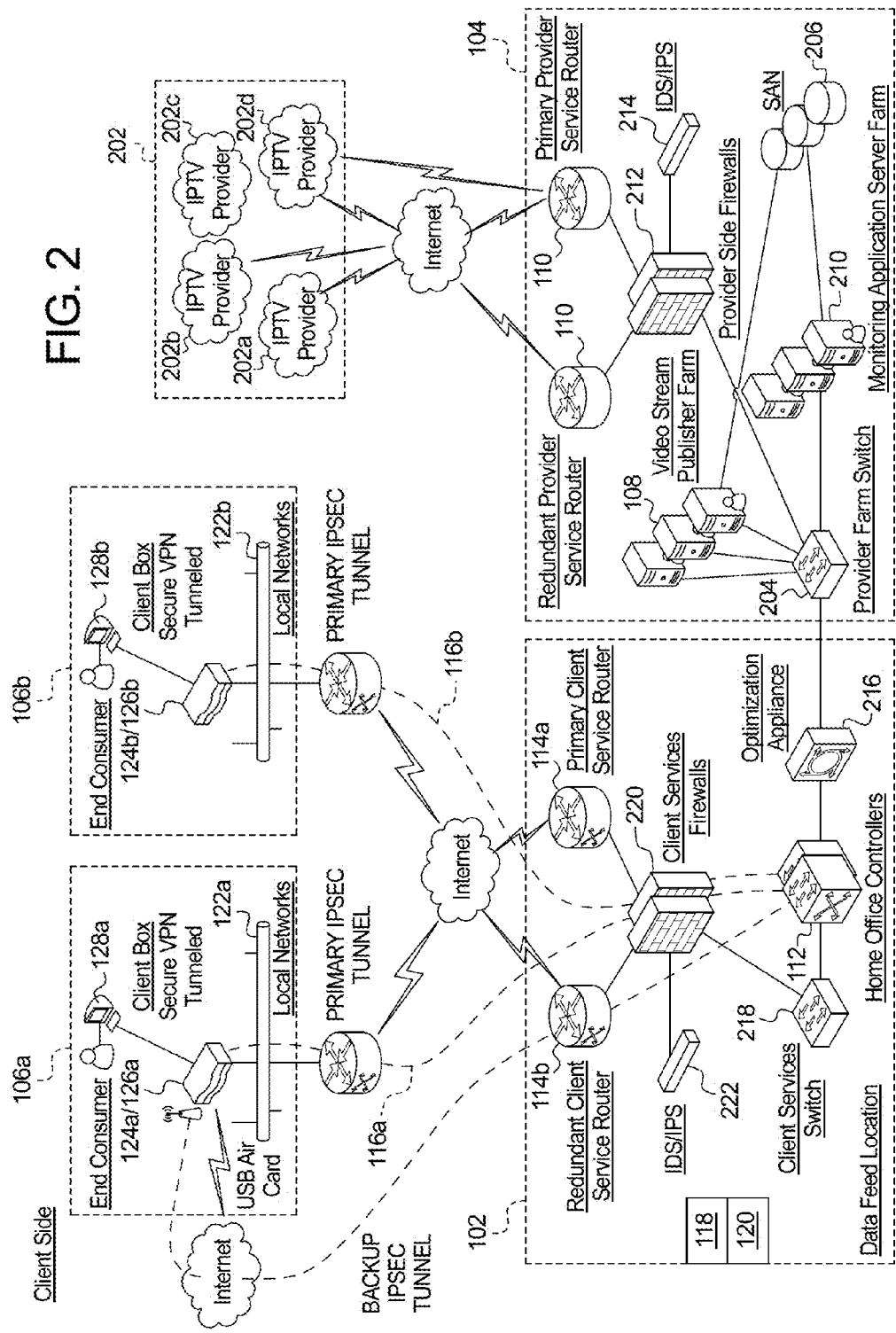

FIG. 2 shows a functional diagram of the system 100 of FIG. 1. Similar to FIG. 1, the system 100 includes a content delivery network 102, a service provider network 104, and a client network 106. In the embodiment shown in FIG. 2, for brevity and simplicity, a single service provider network 104 is shown. However, it should be appreciated that each IPTV service provider 202a, 202b, 202c, and 202d is connected to or associated with a respective service provider network 104. Further, while FIG. 2 shows IPTV service providers 202, other embodiments can include cable, fiber optic, and/or satellite service providers.

Service Provider Network

The IPTV service providers 202a, 202b, 202c, and 202d of FIG. 2 each provide television service to different geographical locations. The IPTV service providers 202 transmit multicast television programming across the Internet to the respective service provider networks 104. The multicast television programming includes separate streams of individual television channels routed by routers 110. The service provider network 104 uses a switch 204 to process and route the multicast television programming with unicast programming (provided by the publishers 108) at a switch 204. The example switch 204 also routes requests from client receivers 126 to either the publisher 208 or routers 110 based on the type of request (e.g., unicast or multicast). For instance, a request to view a television channel (e.g., a multicast request) is routed to the router 110 (e.g., an IPTV router) to change which channel is routed to the consumer. Meanwhile, a request to view VoD, applications, widgets, or other features (e.g., unicast programming) is routed by the switch 204 to the appropriate publisher 108. The publisher 108 is communicatively coupled to a storage area network ("SAN") 206, which stores accessible television content and data. In other words, the SAN 206 includes a multimedia library of content that is individually accessible by consumers. The SAN 206 may be implemented by any conventional computer-readable medium, including RAM, ROM, flash memory, magnetic or optical disks, optical memory, or other storage media.

The separation of unicast programming stored at the SAN 206 and unicast programming provided by the publisher 208 is based on content type. For instance, VoD is stored at the SAN 206 because a large database or library is needed to store thousands of movies and television shows. In contrast, information displayed in program guides, applications, widgets, or features is provided by the publisher 208, which compiles this information from other sources. For instance, weather information displayed in a weather application atop live television may be provided by Weather.com®, sports scores displayed in a sports application may be provided by ESPN.com®, and program guide information may be provided by the IPTV service provider 202.

The routers 110 of the service provider network 104 route multicast television programming from the corresponding IPTV service provider 202. The multicast television programming received by the routers 110 from the associated service provider 202 is compressed using, for example, a MPEG-2 or a MPEG-4 codec and transmitted in a MPEG transport stream. The routers 110 may implement, for example, Protocol independent Multicast ("PIM") to manage the distribution and routing of the multicast television programming streams to individual consumers. For example, a consumer requests to view Channel 2 by transmitting a request from receiver 126. The request is routed to the routers 110, which update routing tables to route the multicast television programming stream corresponding to Channel 2 to the receiver 126 via the content delivery network 102. A new request by the same consumer to view Channel 5 causes the routers 110 to update routing tables such that the multicast television programming stream corresponding to Channel 5 is instead routed to the receiver 126 via the content delivery network 102.

The example service provider network 104 of FIG. 2 also includes monitoring servers 210 to monitor television service usage. The monitoring servers 210 may also monitor the network 104 for outages or fluctuations in bandwidth. The monitoring servers 210 may further monitor television service provided to consumers. In some embodiments, the monitoring services 210 may operate in conjunction with or be included within the monitoring device 120 of the content delivery network 102.

The service provider network 104 further includes one or more firewalls 212 and one or more intrusion prevention systems (IPSs) and intrusion detection systems (IDSs) 214. The firewall 212 uses information provided by the IPS/IDS 214 to detect and prevent unauthorized third parties from accessing the service provider network 104. This enables only authorized television programming and data to be communicated between the IPTV service provider 202 and the service provider network 104.

Content Delivery Network

The example content delivery network 102 of FIG. 2 includes an interface 216 (e.g., a remote access point) for receiving encoded television service (e.g., unicast, multicast, upstream, and downstream programming) from the service provider network 104. The interface 216 is connected to the switch 204 (either directly or across the Internet) such that an individual data feed or channel is provided for each subscribing consumer. For instance, to receive television service from IPTV service providers 202, the interface 216 is configured with an Internet connection port for each consumer that will receive television service from the provider. Each port is assigned an IP address by the IPTV service provider 202 so that the switch 204, publisher 108, and routers 110 can manage which port (corresponding to a consumer) is to receive which multicast or unicast content. Thus, instead of assigning an IP address to a consumer (as is done in traditional IPTV systems), the IP address is assigned to the interface 216 of the content delivery system 102.

The interface 216 is connected to controllers 112 such that each port included in the interface 216 is routed to a different portion of the controllers 112. The network manager 118 manages which portion of each controller 112 is assigned to each consumer. The network manager 118 also creates a VPN for each consumer through switches 218, a firewall 220, and routers 114 through the Internet to the endpoint at the decryption processor 124. The firewall 220 is similar to the firewall 212 and is managed by a respective IPS/IDS 222.

As discussed above in conjunction with FIG. 1, the controllers 112 are partitioned for each consumer. Each partition of the controllers 112 receives television service provided by the service provider network 104, encrypts the received service, and transmits the encrypted service to the appropriate consumer via a VPN path. Additionally, each partition of the controllers 112 receives encrypted messages from the consumer multimedia receivers 126 via respective VPN paths, decrypts the messages, and transmits the messages to the appropriate port in the interface 216 (e.g., remote access point) for transmission to the service provider network 104.

The switch 218 routes communications within the content delivery network 102 to appropriate controllers 112 and outgoing firewall 220 interfaces. In instances where the controllers 112 are distributed across geographic locations, the switch 218 routes communications among different locations within the content delivery network 102. Further, the switch 218 may provide redundant backup channels in instances where routers 114 or Internet infrastructure is congested or offline.

Client Network

The example system 100 of FIG. 2 includes client networks 106a and 106b. It should be appreciated that other embodiments can include additional client networks. In the embodiment of FIG. 2, the decryption processor 124 is combined with receiver 126. As a result of this combination, VPN paths 116 are extended to the combined receiver 124/126 rather than only to the decryption processor 124.

FIG. 2 shows that a separate VPN path 116 is configured for each client network 106. For instance, VPN path 116a extends from a first portion of controller 112 through the switch 218, firewall 220, router 114b, and local network 122a to combined receiver 124a/126a. In a similar manner, VPN path 116b extends from a second portion of controller through the switch 218, firewall 220, router 114a, and local network 122b to combined receiver 124b/126b. As a result of using separate VPN paths, the network manager 118 ensures that the client network 106a receives television service designated for combined receiver 124a/126a and client network 106b receives television service designated for combined receiver 124b/126b to maintain the one-to-one correspondence between service providers and consumers.

In this embodiment, a consumer at client network 106a views the television service via display device 128a (e.g., a computer) while a consumer at client network 106b views the television service via display device 128b (e.g., a television). In the client network 106a the display device 128a is connected to the combined receiver 124a/126a via a LAN or WLAN provided by a router. In the client network 106b the display device 128b is connected to the combined receiver 124b/126b via a multimedia connection (e.g., a coaxial cable, high definition multimedia interface ("HDMI"), etc.). It should be appreciated that in other embodiments, consumers can use other types of display devices 128 including, for example, tablet computers, smartphones, projectors, etc.

The separate VPN paths also enable the content delivery network 102 to provide television service from different IPTV providers 202 to different client networks 106. For instance, the client network 106a receives television service from the IPTV provider 202b and the client network 106b receives television service from the IPTV provider 202c. It should accordingly be appreciated that the client networks 106 can receive television service from any television service provider 202 that participates in providing television service to the content delivery network.

Client Network Mobile Device Embodiment

While FIG. 2 shows client networks 106 as being connected to content delivery network 102 via a primary wired connection, in other examples the client networks 106 may be connected to the content delivery network 102 via primary wireless connections. For instance, the decryption processor 124 may be combined with the receiver 126 and the display device 128 as a mobile device. The mobile device wirelessly receives streamed IP television service in the same manner as described in conjunction with the wired connection. However, in this embodiment, a VPN path is established over wireless communication components (e.g., wireless base stations, wireless communication channels, etc.) from the content delivery network 102. The content delivery network 102 may update routing tables to change which transceiver is communicatively coupled to a moving client network 106.

As discussed above, a consumer uses the example mobile device to receive and display IPTV service from any remote location where a physical Internet connection is unavailable. For example, wireless IPTV service can be used by sales personnel of television service providers for sales presentations, door-to-door sales, and/or remote presentations. Additionally, the wireless IPTV service can be used by individual consumers for boating, tail-gating, camping, etc.

Client Network Mobile Network Embodiment

Alternatively, the client network 106 shown in FIG. 2 can include a mobile client network. For instance, the mobile client network can include a demonstration vehicle that provides television service from a particular service provider to groups at public events, trade shows, or presentations. In particular, a demonstration vehicle can include one or more relatively large display devices 128 that are each connected to a receiver 126 and a decryption processor 124. As described above, the decryption processor 124 is connected to the content delivery network 102 via a wired or wireless VPN. As a result, an individual attending a show can visit the demonstration vehicle and view/user the television service of a particular service provider regardless of any geographic limitations of that service provider in the area.

Processor System

Figure 3:
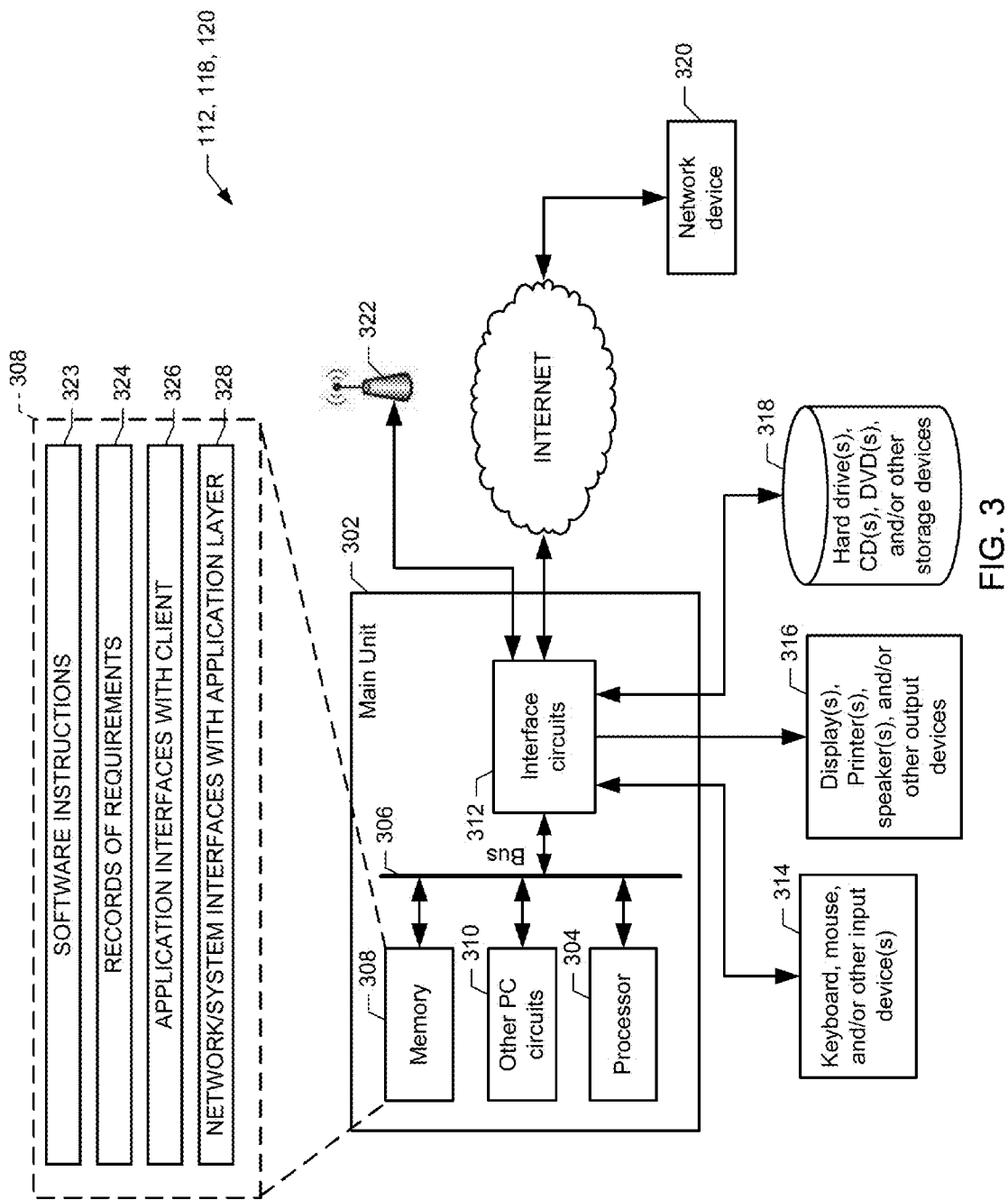
FIG. 3 is a functional block diagram showing electrical systems of an example computing device (e.g., a controller, a network manager, and/or the monitoring device of FIGS. 1 and 2).

A detailed block diagram of electrical systems of an example computing device (e.g., a controller 112, a network manager 118, and/or the monitoring device 120) is illustrated in FIG. 3. In this example, the controller 112, the network manager 118, and/or the monitoring device 120 includes a main unit 302 which preferably includes one or more processors 304 communicatively coupled by an address/data bus 306 to one or more memory devices 308, other computer circuitry 310, and one or more interface circuits 312. The processor 304 may be any suitable processor, such as a microprocessor from the INTEL PENTIUM® or CORE™ family of microprocessors. The memory 308 preferably includes volatile memory and non-volatile memory. Preferably, the memory 308 stores a software program that interacts with the other devices in the system 100, as described below. This program may be executed by the processor 304 in any suitable manner. In an example embodiment, memory 308 may be part of a "cloud" such that cloud computing may be utilized by the controller 112, the network manager 118, and/or the monitoring device 120. The memory 308 may also store digital data indicative of requirements, documents, files, programs, web pages, etc. retrieved from the controller 112, the network manager 118, and/or the monitoring device 120 and/or loaded via an input device 314.

The example memory devices 308 store software instructions 323, records of requirements 324, consumer interface features, consumer VPN records, permissions, protocols, configurations, and/or preference information 326. The memory devices 308 also may store network or system interface features, permissions, protocols, configuration, and/or preference information 328 for use by the controller 112, the network manager 118, and/or the monitoring device 120. It will be appreciated that many other data structures and records may be stored in the memory device 308 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 312 may be implemented using any suitable interface standard, such as an Ethernet interface and/or a Universal Serial Bus (USB) interface. One or more input devices 314 may be connected to the interface circuit 312 for entering data and commands into the main unit 302. For example, the input device 314 may be a keyboard, mouse, touch screen, track pad, track ball, isopoint, image sensor, character recognition, barcode scanner, microphone, and/or a speech or voice recognition system.

One or more displays, printers, speakers, and/or other output devices 316 may also be connected to the main unit 302 via the interface circuit 312. The display may be a cathode ray tube (CRTs), a liquid crystal display (LCD), or any other type of display. The display generates visual displays generated during operation of the controller 112, the network manager 118, and/or the monitoring device 120. For example, the display may provide a user interface and may display reports of system usage monitored by the monitoring device 120. A user interface may include prompts for human input from a user of the network manager 118 including links, buttons, tabs, checkboxes, thumbnails, text fields, drop down boxes, etc., and may provide various outputs in response to the user inputs, such as text, still images, videos, audio, and animations.

One or more storage devices 318 may also be connected to the main unit 302 via the interface circuit 312. For example, a hard drive, CD drive, DVD drive, and/or other storage devices may be connected to the main unit 302. The storage devices 318 may store any type of data, such as records, requirements, transaction data, operations data, historical access or usage data, statistical data, security data, etc., which may be used by the controller 112, the network manager 118, and/or the monitoring device 120.

The controller 112, the network manager 118, and/or the monitoring device 120 may also exchange data with other network devices 320 (e.g., the switch 204, decryption processors 126, etc.) via a connection to the Internet or a wireless transceiver 322 connected to the Internet. Network devices 320 may include one or more servers, which may be used to store certain types of data, and particularly large volumes of data which may be stored in one or more data repository. A server may include any kind of data including databases, programs, files, libraries, records, images, documents, requirements, transaction data, operations data, configuration data, index or tagging data, historical access or usage data, statistical data, security data, etc. A server may store and operate various applications relating to receiving, transmitting, processing, and storing the large volumes of data. It should be appreciated that various configurations of one or more servers may be used to support and maintain the system 100. For example, servers may be operated by various different entities. Also, certain data may be stored in the controller 112, the network manager 118, and/or the monitoring device 120 which is also stored on a server, either temporarily or permanently, for example in memory 308 or storage device 318. The network connection may be any type of network connection, such as an Ethernet connection, digital subscriber line (DSL), telephone line, coaxial cable, wireless connection, etc.

Access to the controller 112, the network manager 118, and/or the monitoring device 120 can be controlled by appropriate security software or security measures. An individual users' access can be defined by the controller 112, the network manager 118, and/or the monitoring device 120 and limited to certain data and/or actions. Accordingly, users or consumers of the system 100 may be required to register with one or more of the controller 112, the network manager 118, and/or the monitoring device 120.

Data Flow of the IPTV System

Figure 4:
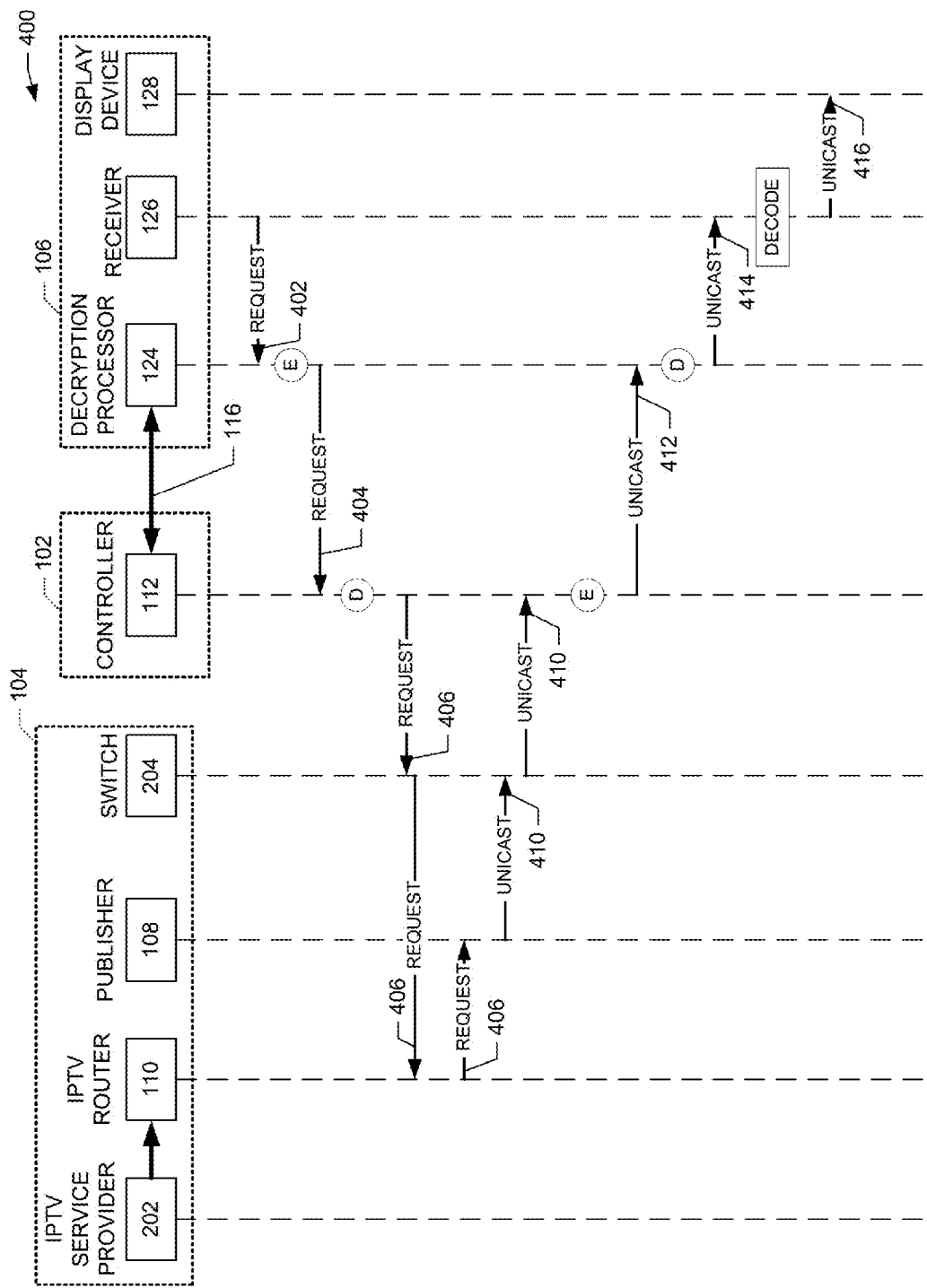
FIGS. 4 and 5 are diagrams showing example data flow in the television steaming system of FIGS. 1 and 2.
Figure 5:
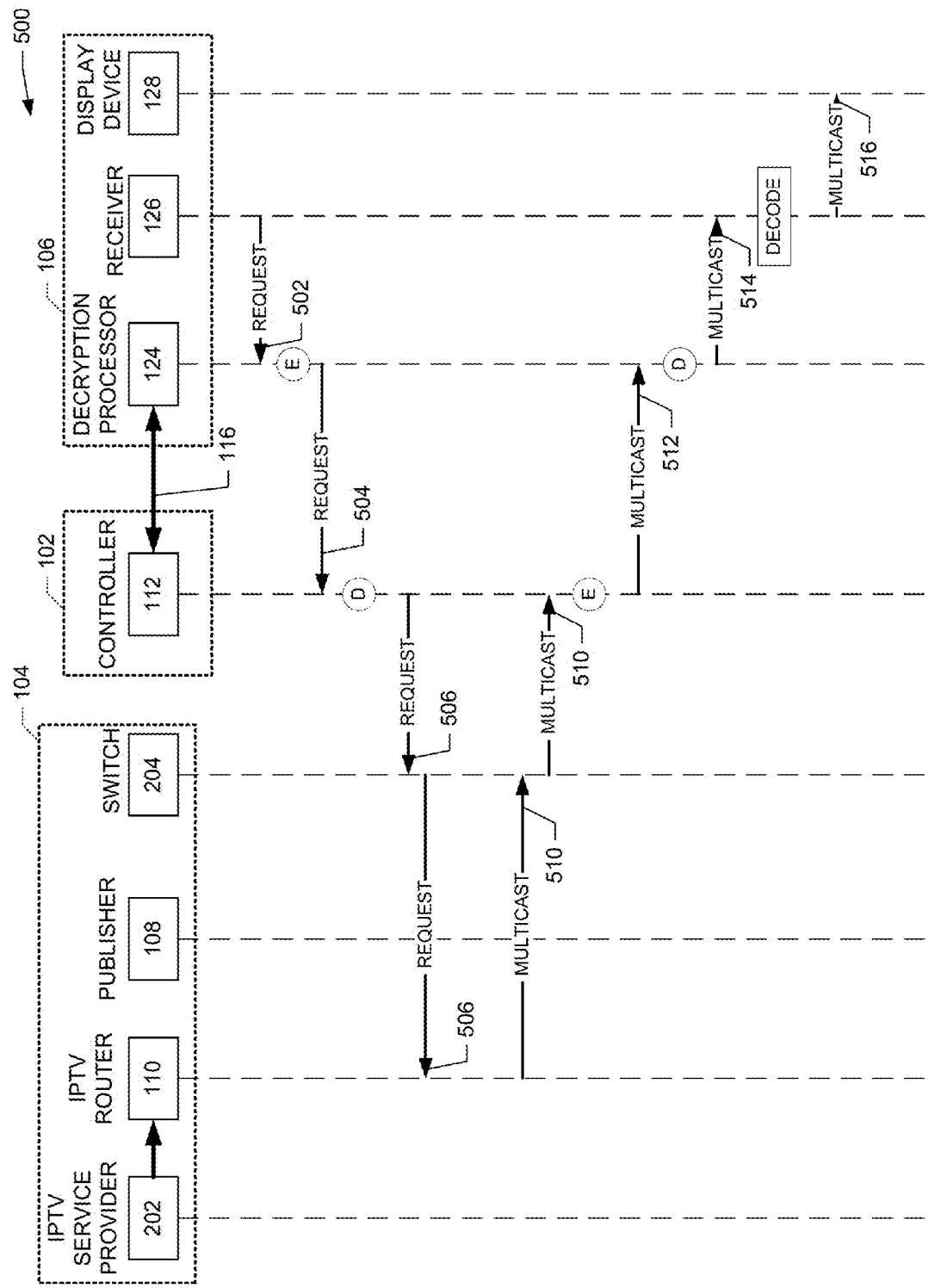

FIGS. 4 and 5 are diagrams showing example data flow in the IPTV steaming system disclosed herein. In particular, FIG. 4 shows a data flow diagram 400 representative of a consumer requesting to view unicast programming (e.g., VoD) and FIG. 5 shows a data flow diagram 500 representative of a consumer requesting to view multicast programming (e.g., live television programming). It should be appreciated that the data flow diagrams 400 and 500 show only example embodiments of data flow through system 100 of FIGS. 1 and 2. Other example embodiments can include different data flows based on the configuration of components. For instance, the flow of data may differ for cable, fiber optic, or satellite television service providers. In an example, the IPTV router 110 would be replaced with a headend or distribution hub for cable-based television service.

In the data flow diagram 400 of FIG. 4, a consumer requests to view unicast television programming on display device 128. The consumer makes the request by entering a selection via a remote, which sends a signal to receiver 126. In this embodiment, the consumer selects to view a movie on demand (e.g., VoD). In other instances the consumer may make a unicast selection that includes a request for an application or widget data, a request to stream a television show/series, or a request to receive a feature of the service provider 202.

The receiver 126 transmits a request message 402 indicating the movie selection. The decryption processor 124 receives the message 402 and encrypts (E) the information within the message 402 to form message 404. The decryption processor 124 transmits the message 404 to the controller 112 via the previously established VPN path 116.

The example controller 112 decrypts (D) the information in the message 404 to form message 406. The controller 112 also applies a source IP address to the message 406, which corresponds to the port on interface 216 (e.g., a remote access point) assigned to the consumer. The source IP address ensures that the response to the message 406 is received on the same port or remote access point. The controller 112 transmits the message 406 to a switch 204 provided in a service provider network 104. The example switch 204 reads the contents of the message 406 to determine the type of the request. In this example, the switch 204 determines that the request is for a unicast VoD and accordingly transmits the message 406 to IP router 208, which forwards the message 406 to publisher 108. In other embodiments, the switch 204 transmits the message 406 directly to the publisher 108.

The example publisher 406 reads the message 406 to determine which television content or programming is requested. The publisher 406 determines that the consumer is requesting a particular movie, accesses a SAN 206 to search for the requested movie, and begins a process to stream the movie to the consumer. The publisher 406 also encodes the video stream to prevent malicious third parties from intercepting and viewing the movie. The publisher 108 streams the movie to the consumer by transmitting data stream 410 to the switch 204. The publisher 108 uses the source IP address in the message 406 as the destination IP address of IP packets used to the stream the movie in the data stream 410.

The switch 204 receives the data stream 410 and reads the destination IP address included within the header of the packets in the stream. The switch 208 transmits the data stream 410 to the controller 112 via the interface port (e.g., a remote access point) corresponding to the destination IP address. The controller 112 encrypts (E) the data stream to form data stream 412. The controller 112 then transmits the data stream 412 to the decryption processor 124 via the VPN path 116. The decryption processor 124 decrypts (D) the data stream 412 to form data stream 414. The receiver 126 decodes the decrypted television service within data stream 414 received from the decryption processor 124 and forwards the decoded data stream 416 to the display device 128. The display device 128 visually and audibly provides the content of the data stream to the consumer.

In FIG. 5, the data flow diagram 500 shows a consumer request for multicast programming (e.g., a live television channel). The consumer makes the request by entering a selection via a remote, which sends a signal to receiver 126. In this embodiment, the consumer selects to view a live television channel. In some instances, the user makes the selection by entering a television channel via the remote. In other instances, the user makes the selection by selecting a channel in a program guide.

The receiver 126 transmits a request message 502 indicating the channel selection. The decryption processor 124 encrypts (E) the information within the message 502 to form message 504. The decryption processor 124 transmits the message 504 to the controller 112 via the VPN path 116. The example controller 112 decrypts (D) the information in the message 504 to form message 506. The controller 112 also applies the source IP address to the message 506. The controller 112 transmits the message 506 to the switch 204, which reads the contents of the message 506. In this example, the switch 204 determines that the request is for a multicast television channel and accordingly transmits the message 506 to IPTV router 110.

The example message 506 includes an instruction to update one or more routing tables such that a virtual route or communication path that carries the requested television channel is additionally multicast (e.g., routed) to the appropriate port within the content delivery network 102. The IPTV router 110 receives the message 506 and updates routing and forwarding tables based on the contents of the message 506. The router 208 may also forward or transmit the message 506 to other IPTV routers and/or switches to cause the appropriate live television channel to be multicast to the appropriate port within the content delivery network 102. It should be appreciated that the live television channel is provided by a headend or distribution hub of the IPTV service provider 202.

Upon updating the routing and forwarding tables, the IPTV router 110 streams the requested live television channel to the switch 204 via encoded data stream 510. The switch 204 transmits the data stream to the controller 112 via the appropriate interface port at the content delivery network 102. The controller 112 encrypts (E) the data stream 510 to form encrypted data stream 512. The controller 112 then transmits encrypted data stream 512 to the decryption processor 124 via VPN path 116.

The example decryption processor 124 decrypts (D) the data stream 512 to form data stream 514. The decryption processor 124 then transmits the decrypted data stream 514 to the receiver 126, which decodes the data stream 514 to form data stream 516. The receiver 126 then transmits the data stream 516 to the display device 128 for presentation to the consumer.

Flowchart of Example Configuration of Television Service

Figure 6:
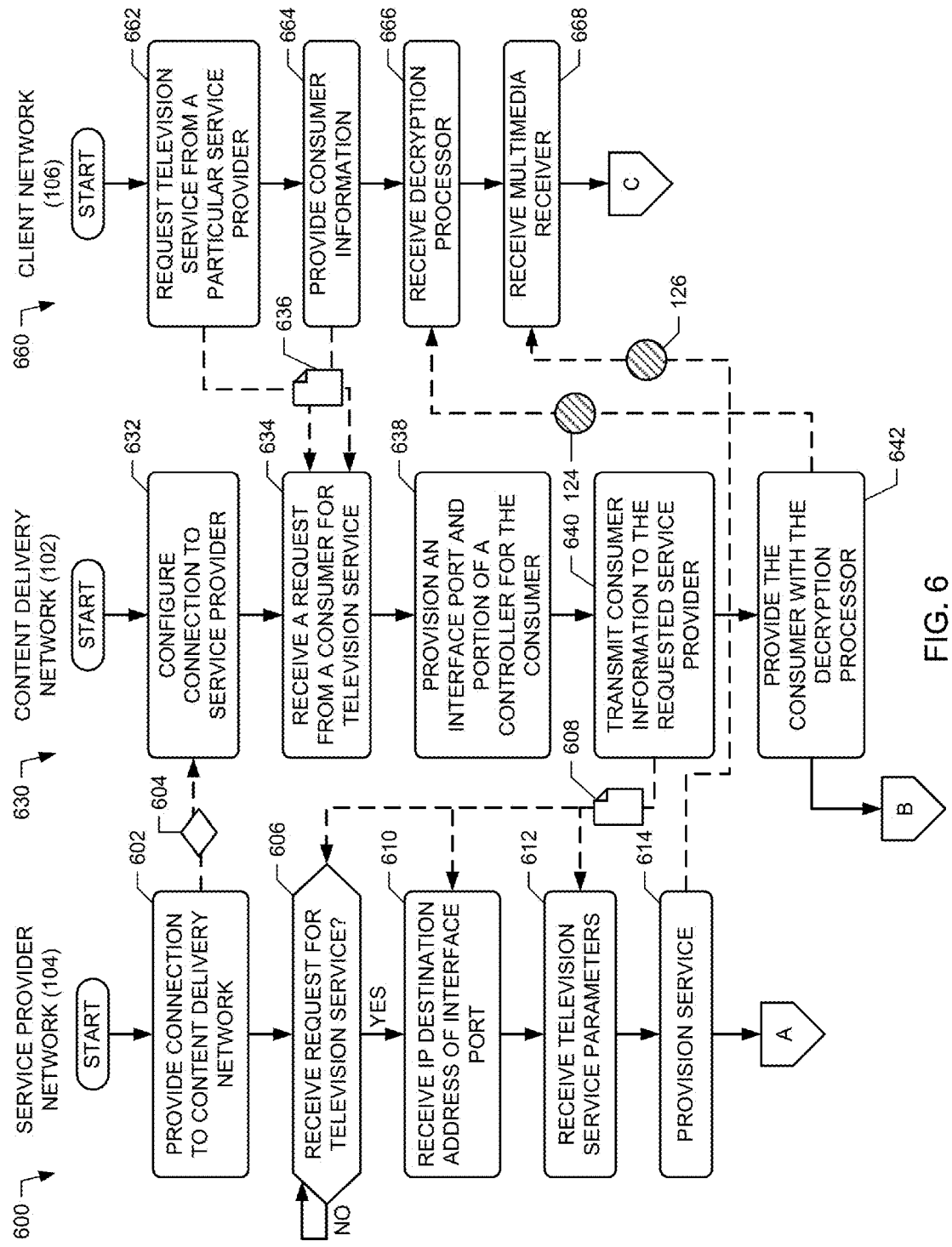
FIGS. 6 and 7 are flow diagrams illustrating example procedures to configure television service, according to an example embodiment of the present invention.
Figure 7:
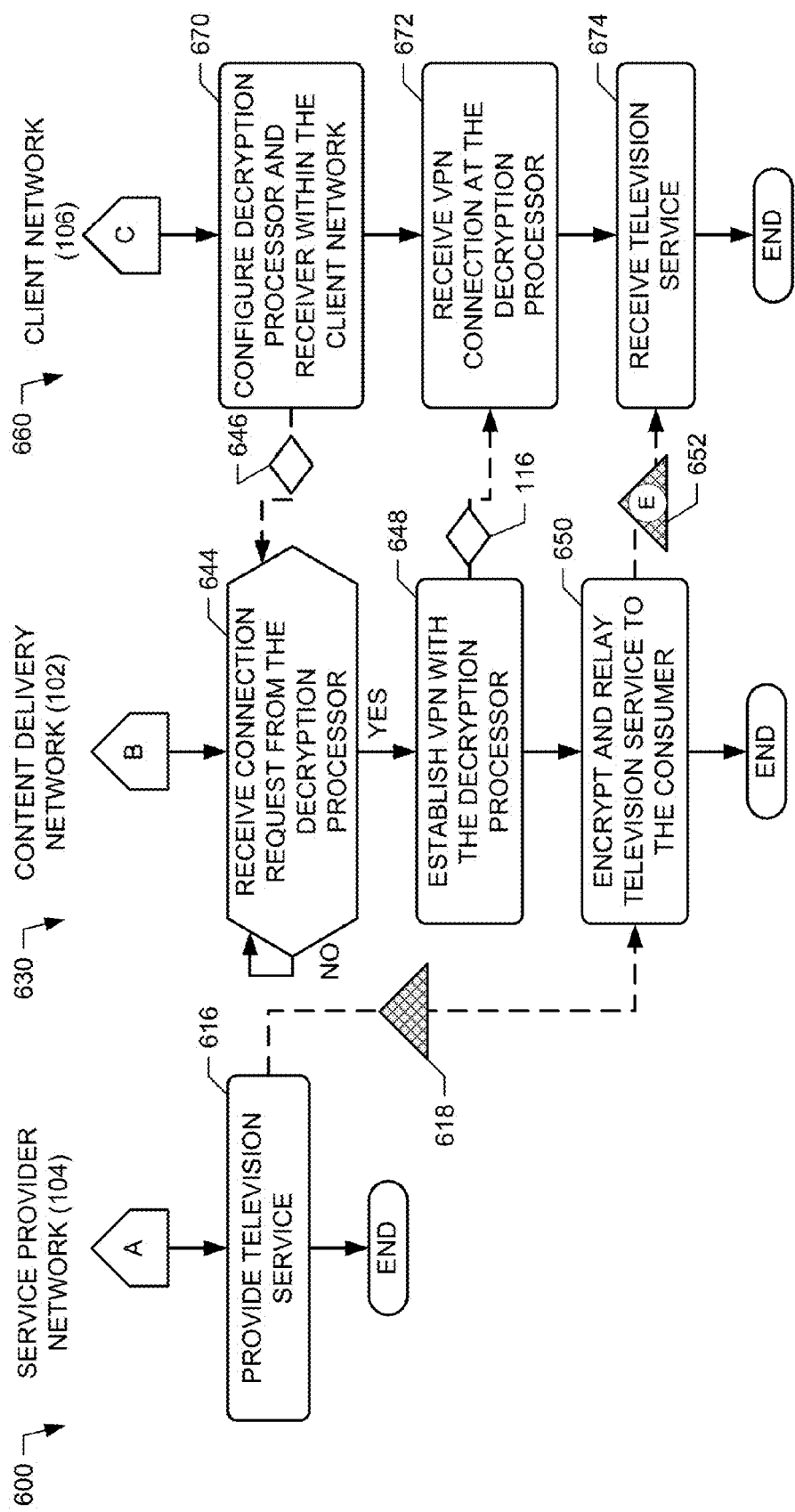

FIGS. 6 and 7 are flow diagrams illustrating example procedures 600, 630, and 660 to configure IPTV television service, according to an example embodiment of the present invention. The example procedures 600, 630, and 660 may be carried out by, for example, the controllers 112, publishers 108, routers 114 and 110, television service providers 202, decryption processors 124, and/or receivers 126 described in conjunction with FIGS. 1, 2, 4, and 5. Although the procedures 600, 630, and 660 are described with reference to the flow diagrams illustrated in FIGS. 6 and 7, it will be appreciated that many other methods of performing the functions associated with the procedures 600, 630, and 660 may be used. For example, the order of many of the blocks may be changed, certain blocks may be combined with other blocks, and many of the blocks described are optional.

FIGS. 6 and 7 show example procedures 600, 630, and 660 to configure IPTV service at client network 106. The procedure begins 600 when a television service provider 202 provides a television connection 604 (e.g., IP-based, cable, fiber optic, satellite, etc.) to content delivery network 102 (block 602). In some embodiments, the connection is a physical connection (e.g., coaxial cable) routed from a distribution hub to a remote access point (or other physical interface) of the network 102. In other embodiments the connection is logical or virtual (e.g., an IP address) connection to an interface of the network 102.

The service provider network 104 then determines if a request for television service has been received for the new connection (block 606). If a request has not been received, the service provider network 104 continues to wait for a request. Once a request has been received, the service provider network 104 (e.g., the television service provider) processes information included within the request 608 (blocks 610 and 612). The information includes, for example, an IP destination address of a remote access point, television service type (e.g., television service package, subscription to premium channels, subscriptions to VoD libraries, subscriptions to features or applications of a service provider, etc. The information also includes consumer information, including, for example billing address, billing information, service address, consumer name, number of rooms to receive service, etc.

Responsive to receiving the request 608, the service provider network 104 provisions television service for the consumer (block 614). Provisioning service includes, for example, setting up routers, switches, hubs, etc. within the service provider network 104 to route service to the appropriate remote access point of the content delivery network 102. For instance, the service provider network 104 may set permissions on IPTV routers and publishers indicating that the consumer is authorized to access specific content (e.g., certain VoD libraries and television channels). Provisioning service also includes physically sending the consumer a receiver 126 and associating identifiers (e.g., decoding keys, serial numbers, etc.) corresponding to the receiver 126 with television service requested by the consumer. It should be appreciated that in other embodiments the content delivery network 102 can physically send the receiver 126 to the consumer.

After provisioning service, the service provider network 104 provides television service 618 (block 616). As discussed above, the television service includes, for example, multicast programming, unicast programming, upstream programming, and/or downstream programming. The service provider network 104 continues to provide television service until the consumer requests to terminate service. Upon ending television service, the example procedure 600 terminates.

The procedure 630 of FIG. 6 begins when content delivery network 102 configures a connection 604 to a television service provider network 104 (block 632). As discussed above, the content delivery network 102 configures the connection 604 by designating a remote access point to receive television service for a consumer. At this time, the specific consumer does not have to be identified. The content delivery network 102 may pre-configure a certain number of connections with different television service providers to reduce consumer connection times upon a consumer requesting service. In other embodiments, the service provider network 104 may only, for example, assign an IP address to a remote access point in response to a request from a consumer for IPTV service.

The content delivery network 102 next receives a request 636 from a consumer for television service (block 634). The request includes, for example, a name of a television service provider, type of television service (e.g., premium package information), account information, billing information, address information, Internet connection type/speed, etc. Responsive to receiving the request 636, the content delivery network 102 provisions remote access point (e.g., an interface port) and a portion of a controller 112 for the consumer (block 638). A network manager 118 of the content delivery network 102 provisions the interface port by selecting an available port that is connected (or configured to be connected) to the particular television service provider requested by the consumer. The network manager 118 also provisions the controller 112 by allocating portions of a processor or server to process (e.g., encrypt/decrypt) television service for a consumer.

The example content delivery network 102 also transmits at least some of the consumer information included within the request 636 to the appropriate service provider 104 in message 608 (block 640). As discussed above, the message 608 provides a service provider with consumer account information and television service package information. The content delivery network 102 further physically provides the consumer with a decryption processor 124 (block 642). In some embodiments, the content delivery network 102 may provide the decryption processor 124 over the Internet as a software application. Additionally or alternatively, the content delivery network 102 may provide the consumer with the multimedia receiver 126 instead of the content delivery network 104 providing one.

The example procedure 630 continues in FIG. 7 when the content delivery network 102 (e.g., the network manager 118) determines whether a decryption processor 124, provided to the consumer, requests 646 to connect (block 644). The request 646 includes, for example, an IP address of the decryption processor 124 (or an IP address of a gateway/LAN 122 connected to the decryption processor 124), an identifier of the decryption processor 124, and/or security credentials stored to the decryption processor 124.

If a request 646 is not received, the content delivery network 102 continues to wait for a request. On the other hand, if a request 646 is received, the content delivery network (e.g., the network manager 118) establishes a VPN path 116 from the partitioned portion of the controller 112 to the decryption processor 124 (block 648). The network manager 119 creates the VPN path 116 by, for example, updating routing and forwarding tables with the IP address of the decryption processor 124 among switches 218 and routers 114 within the content delivery network 102 and/or the Internet.

Responsive to creating the VPN path 116, the content delivery network 102 encrypts television service 616 and transmits encrypted television service 642 to the decryption processor 124 (block 650). The content delivery network 102 also decrypts and transmits requests received from the decryption processor 124 to the appropriate service provider network 104. The content delivery network 102 continues to provide IPTV service until the consumer requests to terminate service. Upon ending television service, the example procedure 630 terminates.

The procedure 660 of FIG. 6 begins when the client network 106 transmits the request 636 for television service (block 662 and 664). The request 636 includes a name of a desired service provider and consumer account information. The request 636 may be made by a consumer calling, for example, the content delivery network 102. Alternatively, the request 636 may be made by a consumer via a web page provided by the network manager 118 of the content delivery network 102.

The client network 106 next receives a decryption processor 124 and a multimedia receiver 126 responsive to the request 636 (blocks 666 and 668). As discussed above, the client delivery network 102 provides the decryption processor 124 and the service provider network 104 provides the receiver 126. In other examples, both the decryption processor 124 and receiver 126 may be provided by either the content delivery network 102 or the service provider network 104. For instance, the decryption processor 124 could be combined with the receiver 126, in which case only one of the networks 102 or 104 would provide the equipment.

The example procedure 660 of FIG. 7 continues by the client network 106 configuring the decryption processor 124 and the receiver 126 (block 670). The decryption processor 124 and receiver 126 are configured by a consumer connecting the decryption processor 124 to a gateway or LAN 122 and connecting the receiver to the decryption processor 124. The configuration also includes the decryption processor 124 transmitting a request 646 to connect to the content delivery network 102. After transmitting the request 646, the client network 106 receives a VPN connection at the decryption processor 124 (block 672). Once the VPN path 116 has been established at the decryption processor 124, the client network 106 receives encrypted television service 652 (block 674). The client network 106 continues to receive television service (e.g., IPTV service) until the consumer requests to terminate service. Upon ending television service, the example procedure 660 terminates.

Television Service Monitoring

Figure 9:
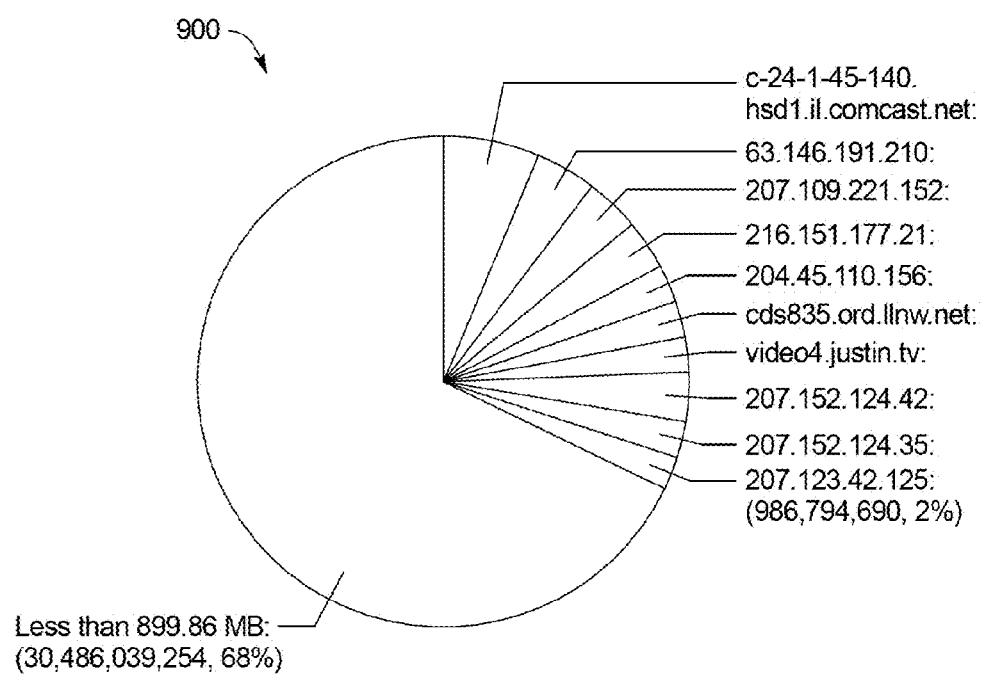

FIGS. 8 and 9 show diagrams of data structures including data collected and processed by the example monitoring device 120 of FIGS. 1 and 2. In particular, FIG. 8 shows a data structure 800 of a data log of a single consumer. The consumer is identified by a code (e.g., YFFZG), which is referenced to consumer demographic and/or geographic information. For example, the data in the data structure 800 may be combined with demographic or geographic information for a plurality of consumers to provide audience information. For instance, the monitoring device 120 can use the data in the data structure 800 with corresponding consumer demographic information to report average viewer demographics for a particular television channel, television show, time period, etc.

To compile information into the data structure 800, the example monitoring device 120 uses simple network management protocol ("SNMP") to monitor what information is being passed through controllers 112. The monitoring device 120 may also use Syslogging and/or remote network monitoring ("RMON") probe equipment to detect what television service is being transmitted to which consumers. To detect what content is being viewed the monitoring device 120 may use a decoding security key provided by the service provider to identify programming information included within the television service streamed to the consumer.

The monitoring device 120 may continuously monitor each consumer or periodically monitor each consumer. In some embodiments, the monitoring device 120 may monitor what television service is being transmitted to a consumer in response to detecting a request to change programming (e.g., the requests 404 and 504). In yet other examples, the monitoring device 120 may only monitor consumers who agree to be monitored.

In the illustrated example of FIG. 8 the data structure 800 shows that the monitoring device 120 records a type of programming (e.g., "Programming"), an average amount of bandwidth consumed to view the programming, a description of the programming, a date/time the programming was viewed, and how long the programming was viewed by a consumer (e.g., "Duration"). As shown in FIG. 8, the programming type specifies whether the viewed television service was multicast, unicast, upstream, downstream. In instances, where the service is unicast, the programming type can specify the type of service (e.g., VoD, application, feature, widget, etc.).

It should be appreciated that the data structure 800 shown in FIG. 8 is only one example of data logging performed by the monitoring device 120. In other embodiments, the monitoring device 120 can record which commercials were viewed by a consumer or which television service was recorded by a consumer. The monitoring device 120 may also record requests provided by consumers.

Further, the monitoring device 120 can process collected data to identify trends, patterns, behaviors, etc. The network manager 118 may use the processed data to, for example, allocate controller 112 bandwidth. For instance, the monitoring device 120 can detect that a consumer streams a movie via VoD every Saturday night. In response, the network manager 118 may allocate more bandwidth on the controller 112 for the consumer on Saturday nights. In another example, the network manager 118 may use the processed data to predict how bandwidth should be allocated to different geographic regions serviced by the controllers 112.

FIG. 9 shows a diagram of a data structure 900 reporting bandwidth usage by consumers. The example data structure 900 is representative of reports that may be provided by the monitoring device 120 to third parties or television service providers. It should be appreciated that data structure 900 is only one example of reported data. Other examples can include other types of reports including, for example, bar charts, spreadsheets, textual reports, etc. In other embodiments, a third party may access the monitoring device via an API and specify which data is to be reported and configure how the data is to be reported.

The example data structure 900 of FIG. 9 may be compiled and processed using, for example netflow analysis. The data structure 900 shows that approximately 68% of all consumers of a particular service provider consume less than 700 MB per month. The data structure 900 also shows IP addresses of consumers who use significant amounts of bandwidth. The amount of used bandwidth is shown as a percentage of the area of the data structure 900. A service provider may use the data structure 900 to determine, for example, which consumers should be charged a surcharge based on their excessive use of television service.

Multiple Gateways Embodiment

Figure 10:
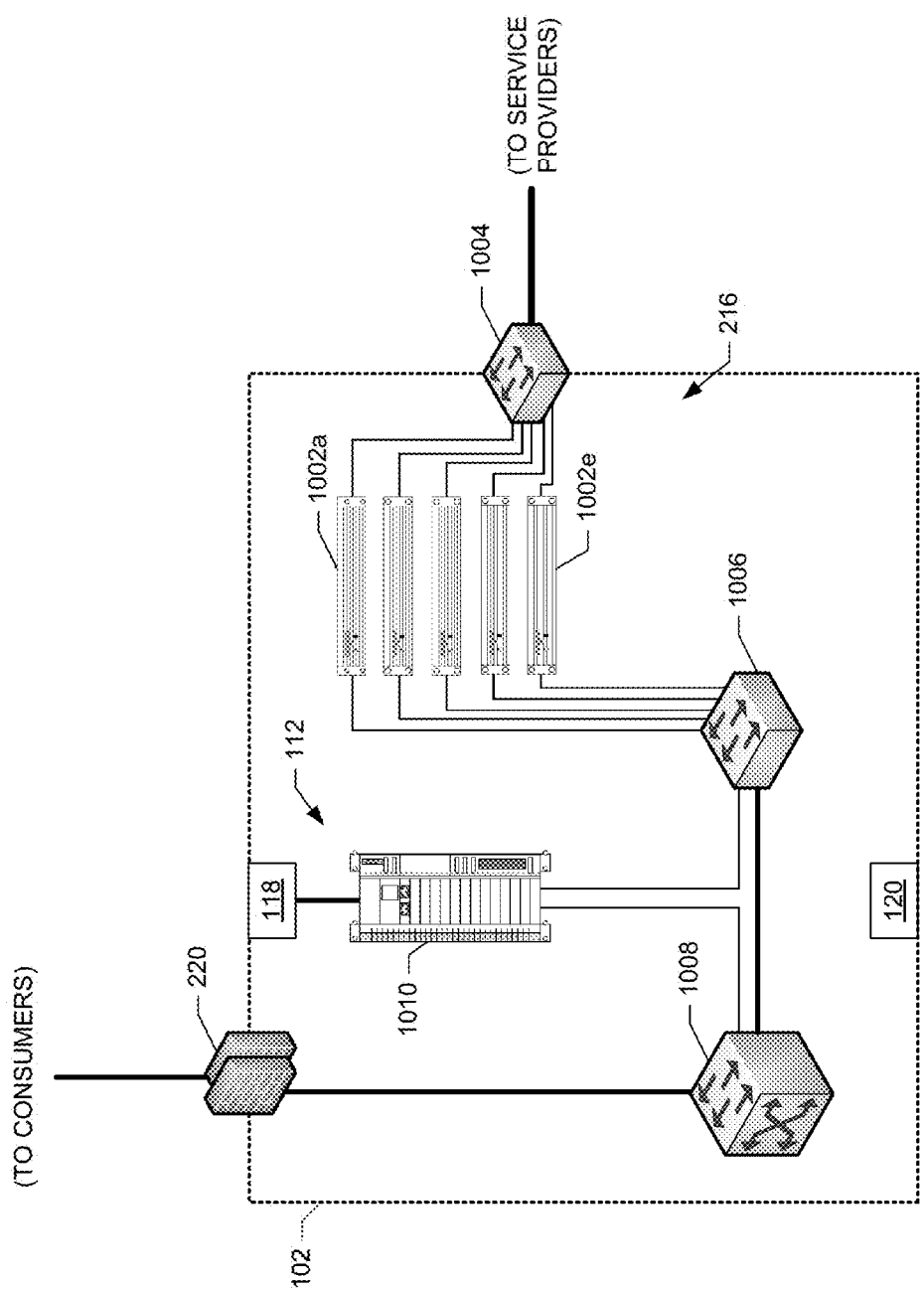
FIGS. 10 to 13 show diagrams of different embodiments of remote access points implemented within a content delivery network or a service provider network of FIGS. 1 and 2.

As discussed above, the content delivery network 102 can have different configurations of physical interfaces (e.g., remote access points or gateways) that receive television service from service provider networks 104. In FIG. 1, the physical interfaces were described as being included (physically or logically) within the controller 112. In FIG. 2, the physical interface 216 was shown as being separate from the controller 112. FIG. 10 shows a diagram of how the controller 112 and interface 216 are separated into different hardware components. For brevity, the router 114 and the switch 218 of FIG. 2 are not shown.

In the embodiment of FIG. 10, the interface 216 includes multiple remote access points 1002a-e and a first router 1004. Each remote access point 1002 includes a physical remote gateway that is individually powered, cabled, and addressed to maintain a one-to-one correspondence between a television service providers and consumers. In some instances, the remote access points 1002 can be stacked or organized in physical racks. In other instances, the remote access points 1002 may be physically separate from each other.

As discussed above in conjunction with FIGS. 1 and 2, the remote access points 1002 provide line termination for IPTV service, cable television service, satellite television service, etc. In other words, the remote access points 1002 convert television service from a format provided by a television service provider into a packetized format for transmission over the Internet. Each remote access point 1002 is configured to convert television service for a particular service provider. For instance, a remote access point 1002 is specifically configured to decode and convert Comcast® television service into IPTV formatted packets. As a result of this configuration, the each of the remote access points 1002 is appropriately communicatively coupled (either physically or logically) to the appropriate television service provider.

In some instances, the remote access points 1002 use Dynamic Host Configuration Protocol ("DHCP") to route packetized IPTV service from service provider networks 104 to an appropriate VPN path or tunnel connected to a consumer's decryption processor 124. In these instances, the remote access points 1002 do not perform packet format conversion because the received television service is already provided in an IPTV format. The remote access points 1002 may also function as multicast (or unicast) rendezvous points for television programming. This means that television service providers 202 assign a destination IP address to a specified remote access point 1002 to stream multicast or unicast programming to the content delivery network 102.

In instances where a remote access point 1002 receives IPTV service, the connection is based on IP addressing managed locally by the first router 1004. However, in instances where the connection is based on a cable, satellite, or fiber optic connection, each remote access point 1002 is connected to the appropriate cable, satellite, or fiber optic connection. In these instances, the first router 1004 is replaced by hardware and cabling to one or more service provider networks 104.

In the embodiment of FIG. 10, the first router 1004 provides television service routing from IPTV-based television service provider networks 104 to each of the remote access points 1002. The first router 1004 routes television service received over, for example, a high capacity bus to the appropriate remote access point 1002. The first router 1004 includes a routing and forwarding that that identifies to which router television service is to be routed based on assigned IP addresses. For instance, each of the remote access points 1002 may be assigned an IP address using 192.168.1.x/24 addressing (where x varies for each access point). The first router 1004 includes a routing and forwarding table that specifies which port corresponds to which of the remote access points 1002, with each access point being connected to a separate port. When television service (unicast or multicast programming) is received from the service provider network 104, the first router 1004 reads the individual packets comprising the television service to identify a destination IP address. The first router 1004 then determines which of the remote access points 1002 is assigned to the destination IP address. The first router 1004 then transmits the television service to the appropriate remote access point 1002 via the corresponding port.

The example first router 1004 also uses IP addressing to transmit requests for multicast and unicast programming received from the remote access points 1002 to the appropriate service provider network 104. In these instances, the first router 1004 uses a destination IP address included in the request to determine the appropriate service provider network 104.

In addition to the interface 216, the content deliver network 102 also includes the controller 112. The example controller 112 of FIG. 10 includes a second router 1006, an encryption controller 1008, and a VPN controller 1010. The example VPN controller 1010 operates in conjunction with the network manager 118 to establish a secure IP communication path between each decryption processor 124 and the encryption controller 1008. As discussed above, the decryption processor 124 transmits configuration information that is routed within the content delivery network 102 to the VPN controller 1010. The VPN controller 1010 establishes an encrypted IP communication path (e.g., a VPN tunnel) from a portion of the encryption controller 1008 to the decryption processor 124. The VPN controller 1010 also establishes a specific VLAN path between the second router 1006 and the encryption controller 1008 to maintain the one-to-one correspondence between consumer and television service provider. As part of establishing the VLAN path, the VPN controller 1010 updates a routing and forwarding table in the second router 1006 such that communications associated with a particular IP address are routed by the second router 1006 to the appropriate remote access point 1002. The VPN controller 1010 also configures the encryption controller 1008 so that communications received from a particular VPN path are transmitted by the encryption controller 1008 to the appropriate VLAN path.

The example second router 1006 is individually connected to each of the remote access points 1002 via a separate communication path. The second router 1006 routes communications from consumers to the appropriate remote access points 1002 using IP addressing similar to the first router 1004. The second router 1006 also routes communications from the remote access points 1002 to the appropriate portion of the encryption controller 1008 via a corresponding VLAN path.

In a consumer use example of the system shown in FIG. 10, a multimedia receiver 126 receives a request from a consumer for unicast or multicast programming. The decryption processor 124 at the client network 106 encrypts the request and transmits the request via a VPN path to encryption controller 1008. The encryption controller 1008 decrypts the request and transmits the request to the second router 1006 via the appropriate VLAN path. The second router 1006 routes the request to the appropriate remote access point 1002 based on the VLAN path from which the request was received. In other instances, the second router 1006 may use an IP address (source or destination) to determine which remote access point 1002 is to receive the request. The remote access point 1002 processes the request, determines the appropriate multicast or unicast source associated with the request. In some instances, the remote access point 1002 transmits the request to a service provider network 104 to receive the requested multicast or unicast programming. In other instances, the remote access point 1002 tunes or selects the appropriate multicast (or downstream) programming and transmits this selected programming to the encryption controller 1008 (via the second router 1006) for encryption and transmission to the consumer.

Multiple Virtual Gateways Embodiment

Figure 11:
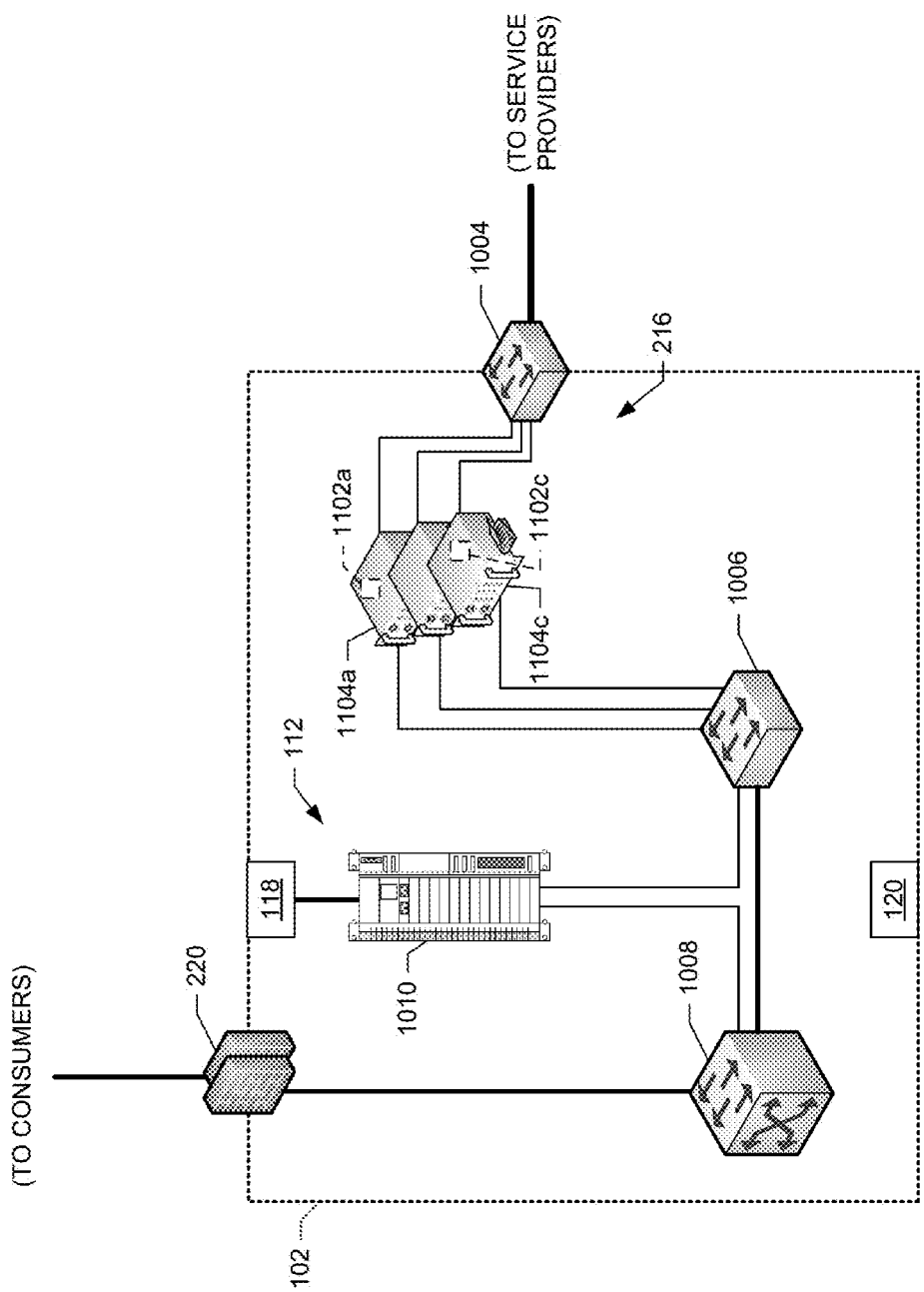

FIG. 11 shows a diagram of a content delivery network 102 that includes virtual remote access points 1102a-c. Similar to FIG. 10, the content delivery network 102 of FIG. 11 includes first and second routers 1004 and 1006, an encryption controller 1008, and a VPN controller 1010. In this embodiment, the virtual remote access points 1102 include one or more rack mounted appliances (e.g., servers 1104a-c) that logically perform the functions of the remote access points 1002 described in conjunction with FIG. 10. For instance, instead of having a dedicated hardware component for each user, the virtual remote access points 1102 enable remote access point functionality to be partitioned for each consumer among one or more processors, servers, etc.

While FIG. 11 shows a single virtual remote access point 1102 on each server 1104, it should be appreciated that each server can include tens, hundreds, thousands, etc. virtual remote access points 1102. In some instances, each server 1104 may host virtual remote access points 1102 for one particular television service provider 202. For example, the server 1104a could host virtual remote access points 1102 associated with Time Warner® while the server 1104c (or a blade of the server 1104b) hosts virtual remote access points 1102 associated with Comcast®. In other alternative instances, the servers 1104 may host virtual remote access points 1102 associated with more than one type of television service provider 202. Further, while the servers 1104 are shown as being included within the content delivery network 102, it should be appreciated that the virtual remote access points 1102 can be hosted by remotely located servers in a cloud computing infrastructure.

Similar to FIG. 10, the virtual remote access points 1102 of FIG. 11 are communicatively coupled to the first and second routers 1004 and 1006. In this embodiment, because the remote access points are virtualized, the first and second routers 1004 and 1006 are dynamically managed by the VPN controller 1010 to ensure that communications associated with each consumer are routed to the appropriate virtual remote access point 1102. For example, the VPN controller 1010 assigns a portion of the server 1104a to perform the functions of the virtual remote access point 1102a for a particular consumer in response to a configuration request from a newly installed decryption processor 124. The VPN controller 1010 also creates a VLAN path from the encryption controller 1008 to the portioned portion of the server 1104a hosting the virtual remote access point 1102a to maintain a one-to-one correspondence in the content delivery network 102. At some time later, the VPN controller 1010 or the network manager 118 determines that processing load should be balanced among the servers 1104. In response, the VPN controller 1010 configures server 1104c to host the virtual remote access point 1102a. After migrating the virtual remote access point 1102a, the VPN controller 1010 also updates routing and forwarding tables to change the routing of the VLAN path to the new server.

Virtual Routing and Forwarding Router Embodiment

Figure 12:
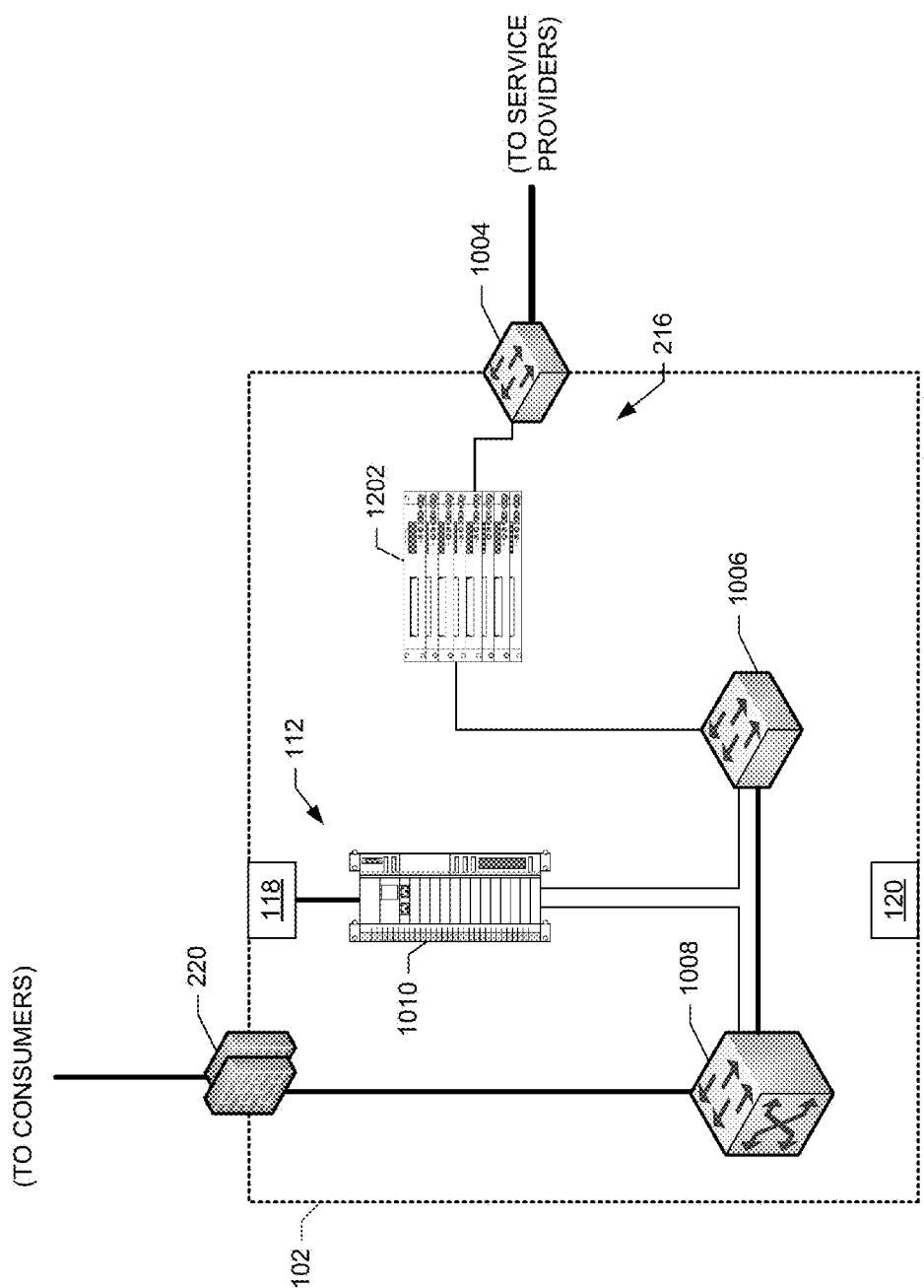

FIG. 12 shows a diagram of a content delivery network 102 that includes a virtual routing and forwarding ("VRF") router 1202. Similar to FIG. 10, the content delivery network 102 of FIG. 12 includes first and second routers 1004 and 1006, an encryption controller 1008, and a VPN controller 1010. In this embodiment, the VRF router 1202 performs the functions of the remote access points 1002. While FIG. 12 shows only one VRF router 1202, it should be appreciated that in other embodiments the content delivery network 102 can include many VRF routers 1202.

The example VRF router 1202 includes multiple instances of a routing and forwarding table, thereby enabling portions of the VRF router 1202 to be allocated separately to different consumers to maintain a one-to-one correspondence between consumers and television service providers. Each instance of the routing and forwarding table specifies IP addressing parameters, DHCP routing, and multicast (and/or unicast) programming access information. It should be appreciated that the VRF router 1202 is used in instances when IPTV service is received from service provider networks 104. The VRF router 1202 may not be used when, for example, television service is received by a cable, satellite, or fiber optic connection because the VRF router 1202 is not configured to convert television service into a packetized format.

Similar to the virtual remote access points 1102 of FIG. 11, the VRF router 1202 of FIG. 12 is communicatively coupled to first and second routers 1004 and 1006. The VPN controller 1010 establishes which portions of the VRF router 1202 are to host remote access point functionality for each consumer. The VPN controller 1010 also provisions VLAN paths for each consumer from the encryption controller 1008 through the second router 1006 to the appropriate portion of the VRF router 1202. Further, each portion of the VRF router 1202 associated with a consumer is assigned an IP address by a television service provider 202. In this manner, television service providers 202 can address unicast and multicast programming to the appropriate portion of the VRF router 1202.

As a result of the provisioning and IP address assignment, IPTV service received at each provisioned portion of the VRF router 1202 is routed by the second router 1006 via the appropriate VLAN path to the encryption processor 1008 for encryption and transmission to the corresponding decryption processor 124. Additionally, requests from consumers are decrypted at the encryption processor 1008 and transmitted across the appropriate VLAN path to the corresponding portion of the VRF router 1202. The portion of the VRF router 1202 determines the type of the request and transmits the request to the appropriate content source (e.g., publisher or IPTV router) within the service provider network 104.

Television Service Provider Remote Access Point Embodiment

Figure 13:
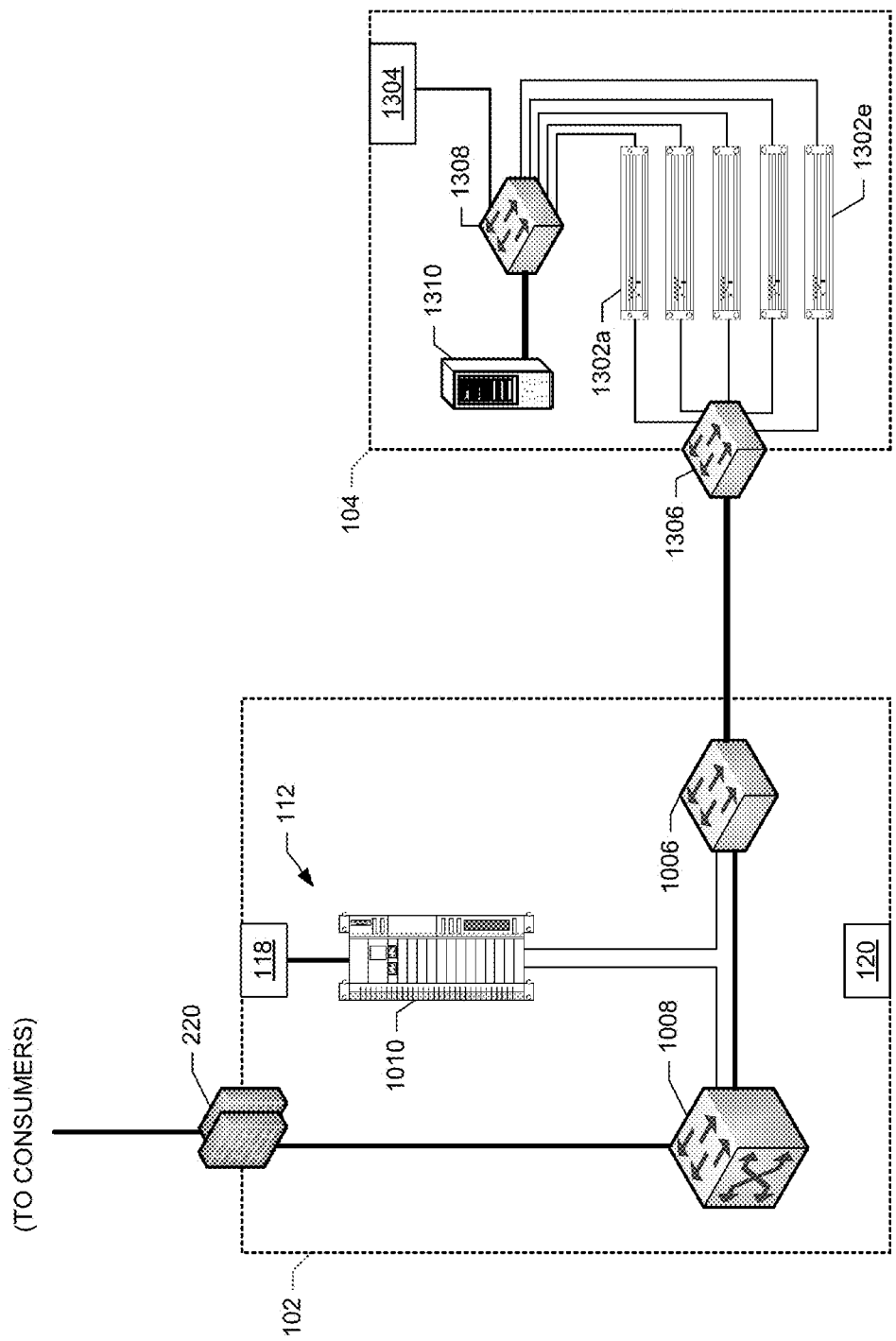

In FIGS. 10 to 12, the remote access points (or VRF router) were included within the content delivery network 102. However, in other embodiments, the remote access points may be located closer to headends within a service provider network 104. FIG. 13 shows a diagram of remote access points 1302a-e located within the service provider network 104 in logical proximity to headend 1304. It can be appreciated that all of the remote access points 1302 located in the service provider network 104 are configured specifically for that service provider (e.g., Time Warner®).

While FIG. 13 shows the service provider network 104 including the remote access points 1302, in other embodiments the service provider network 104 can instead include virtual remote access points or VRF routers, as described in conjunction with FIGS. 11 and 12. Further, while FIG. 13 shows the remote access points 1302 in proximity to the headend 1304, in other embodiments the remote access points 1302 may be located further upstream of the television service provider at, for example, super-headends, datacenters, etc.

In this embodiment, the remote access points 1302 are configured to have functionality similar to the remote access points 1002 described in conjunction with FIG. 10. For instance, the remote access points 1302 provide IP addressing, DHCP transmissions, and multicast (and/or unicast) rendezvous point specification. However, instead of being located within the content delivery network 102, the remote access points 1302 are located within the service provider network 104 and managed by a television service provider 202. Locating the remote access points 1302 within the service provider network 104 provides control to the television service providers rather than the content delivery network 102. This configuration may be beneficial in instances where service providers desire to manage the provisioning of their own remote access points.

FIG. 13 shows the remote access points 1302 communicatively coupled to service provider switch 1306 and service provider router 1308. The service provider switch 1306 routes television service from the remote access points 1302 through the Internet to the second router 1006. The service provider switch 1306 also routes requests and communications originating from client networks 106 to the appropriate remote access point 1302. The service provider router 1308 may include one or more physical routers within the service provider network 104 that are configured to route multicast programming from the headend 1304 and/or unicast programming from the publisher 1310 to the remote access points 1302. For example, a request for a specific multicast channel is transmitted from the remote access point 1302 to the router 1308. In response to the request, the router 1308 updates routing and forwarding tables such that the requested multicast channel is routed to the appropriate remote access point 1302.

It should be noted that since the remote access points 1302 are external to the content delivery network 102, the VPN controller 1010 has to establish a secure communication path (e.g., a VPN path) to at least the service provider switch 1306 to maintain the one-to-one correspondence between consumers and service providers. In some instances, the VPN controller 1010 creates a VPN path from the second router 1006 to the switch 1306 for each consumer. In these instances, the VPN controller 1010 provisions a VLAN path between the encryption processor 1008 and the second router 1006, as described above in conjunction with FIG. 10. In other instances, the VPN controller 1010 establishes a VPN from the encryption controller 1010 to the switch 1306. In either of these instances, it should be noted that a single VPN is not extended from the client network 102 to the service provider network 104. The reason for having two separate VPNs for each consumer with adjacent endpoints in the encryption controller 1010 is so that the encryption controller 1008 can encrypt/decrypt IPTV service.

In some alternative embodiments, the television service providers may provision encryption controllers within the service provider networks, thereby making the content delivery network moot. In these alternative embodiments, the VPN controller 1010 is also located within the service provider network 104 and is configured to establish a VPN path from the switch 1306 to a decryption processor 124 for each subscribing consumer. However, while this configuration enables a television service provider to distribute its service to virtually any connected display device, this configuration does not provide consumers a choice of service providers unless multiple service providers adopt this configuration within their networks.

Flowchart of Configuring a Decryption Processor with Content Delivery Network

Figure 14:
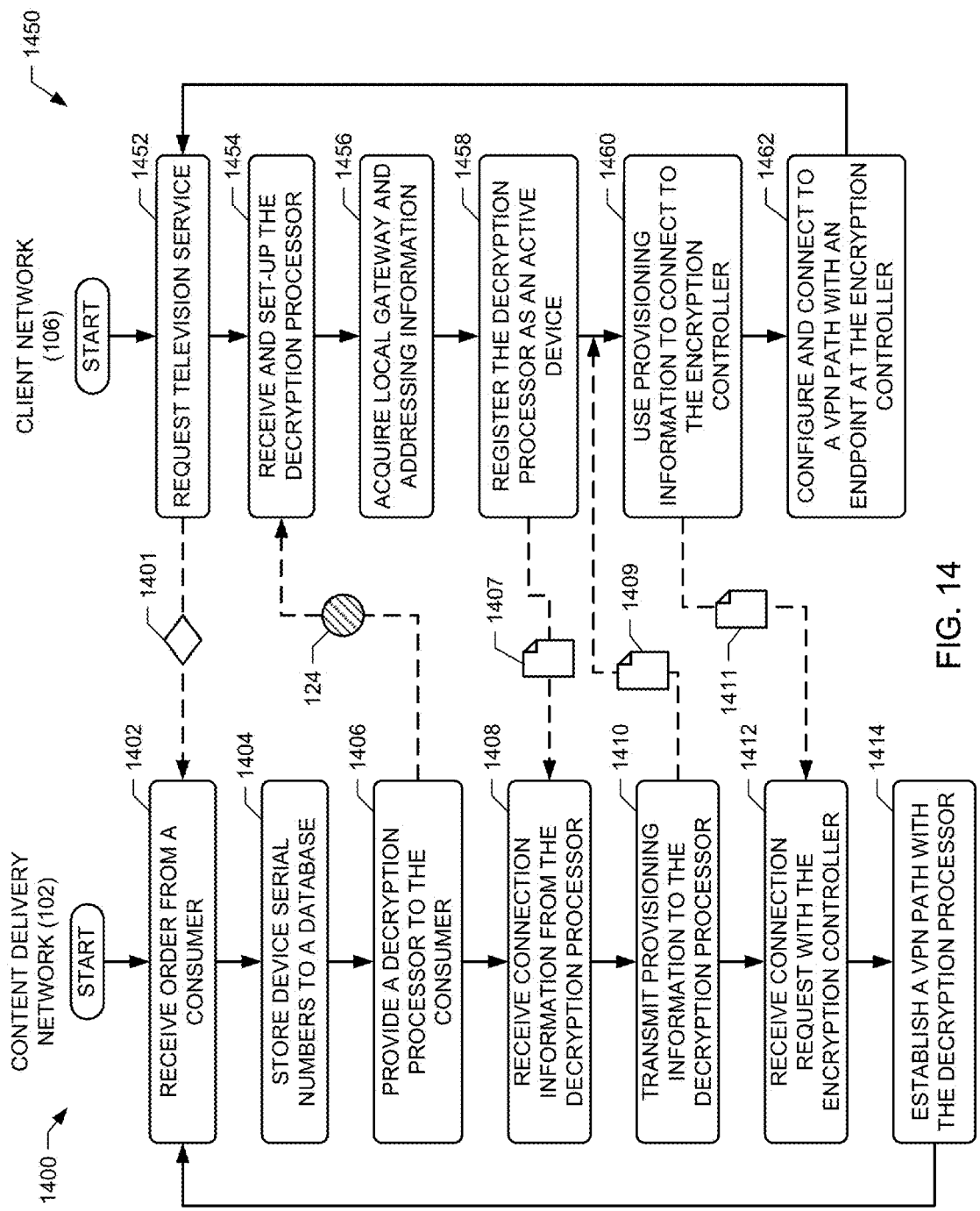
FIG. 14 shows a flow diagram illustrating example procedures to configure a decryption processor with a content delivery network, according to an example embodiment of the present invention.

FIG. 14 shows a flow diagram illustrating example procedures 1400 and 1450 to configure a decryption processor 124 with a content delivery network 102, according to an example embodiment of the present invention. The example procedures 1400 and 1450 may be carried out by, for example, the controllers 112, 1008, 1010, network manager 118, decryption processor 124, and/or receiver 126 described in conjunction with FIGS. 1, 2, 4, 5, and 10 to 13. Although the procedures 1400 and 1450 are described with reference to the flow diagram illustrated in FIG. 14, it will be appreciated that many other methods of performing the acts associated with the procedures 1400 and 1450 may be used. For example, the order of many of the blocks may be changed, certain blocks may be combined with other blocks, and many of the blocks described may be optional.

The procedures 1400 and 1450 of FIG. 14 describe an automated 'phone-home' capability of the decryption processor 124. This capability enables the decryption processor 124 to self-configure at the client network 106 without help from a consumer. As described below, the self-configure ability enables the decryption processor 124 to automatically upgrade firmware or software, update inventory controls at the content delivery network 102, and/or download configuration information from the network manager 118 or the VPN controller 1010.

The procedure 1400 of FIG. 14 begins when the content delivery network 102 (e.g., the network manager 118) receives an order 1401 (e.g., the request 636 of FIG. 6) from a consumer (block 1402). In response to the order 1401, the content deliver network 102 selects a decryption processor 124 to be sent to the consumer and stores a serial number of the decryption processor 124 to an active inventory database (block 1404). The database tracks which decryption processors 124 have been sent to which consumers. It can be appreciated that in embodiments where the decryption processor 124 is implemented as a software application downloadable on a receiver 126 or a display device 128 the content delivery network 102 tracks and stores a unique identifier or code for each copy of software provided to consumers. In the embodiment of FIG. 14, the physical decryption processor 124 is shipped from a supply warehouse directly to the requesting consumer (block 1406).

After the consumer has connected the decryption processor 124, the VPN controller 1010 (and/or the network manager 118) receives connection information 1407 (block 1408). The connection information 1407 includes, for example, registration information including the assigned serial number. In other embodiments, the decryption processor may connect to a cloud-based server or controller using a preprogrammed domain name system ("DNS") corresponding to a specially designated and configured server.

In response to receiving the connection information 1407, the VPN controller 1010 (and/or the network manager 118) transmits provisioning information 1409 to the decryption processor 124 (block 1410). The provisioning information 1409 includes, for example, VPN connection information (including authentication) and/or an IP address of a portion of the encryption controller 1008 assigned as an endpoint of a VPN path. The VPN controller 1010 (and/or the network manager 118) also provisions the VPN path and portion of the encryption processor 1008.

The example procedure 1400 continues by the encryption processor 1008 receiving a connection request 1411 from the decryption processor 124 (block 1412). In response to the connection request 1411, the encryption controller 1412 provides the decryption processor 124 access to the VPN path (block 1414). At this point, the decryption processor 124 may receive encrypted television service and transmit encrypted requests across the VPN path. The example procedure 1400 then returns to block 1400 for the next consumer. In other embodiments, the example procedure ends.

The example procedure 1450 begins when a consumer provides an order 1401 (or request 636) for television service (block 1452). Some time later, the consumer receives and connects a decryption processor 124 to a local network 122 (block 1454). Following activation, the decryption processor 124 then searches and acquires local gateway and addressing information including, for example, a local IP address (block 1456). The decryption processor 124 next registers with the content delivery network 102 by transmitting connection information 1407 (block 1458). For instance, the decryption processor 124 uses a preprogrammed IP address as a destination IP address to transmit the connection information 1407. The connection information enables the content delivery network 102 to register the decryption processor 124 as an active device that is available to connect to a secure VPN path to receive television service.

The example procedure 1450 of FIG. 14 continues by using provisioning information 1409 received from the content delivery network 102 (e.g., the VPN controller 1010) to connect to the encryption controller 1008 (block 1460). The decryption processor 124 then uses preprogrammed parameters to self-configure based on access authorizations provided by the VPN controller 1010, the network manager 118, and/or the encryption controller 1008 to connect to a VPN path. At this point, the decryption processor 124 may receive encrypted television service and transmit encrypted requests across the Internet to a portion of the encryption processor 1008 configured as the endpoint of the VPN path. The example procedure 1450 then returns to block 1452 for the next consumer. In other embodiments, the example procedure 1450 ends as soon as the decryption processor 124 is connected to a VPN path.

Streaming IPTV Service using a Mobile Device

Figure 15:
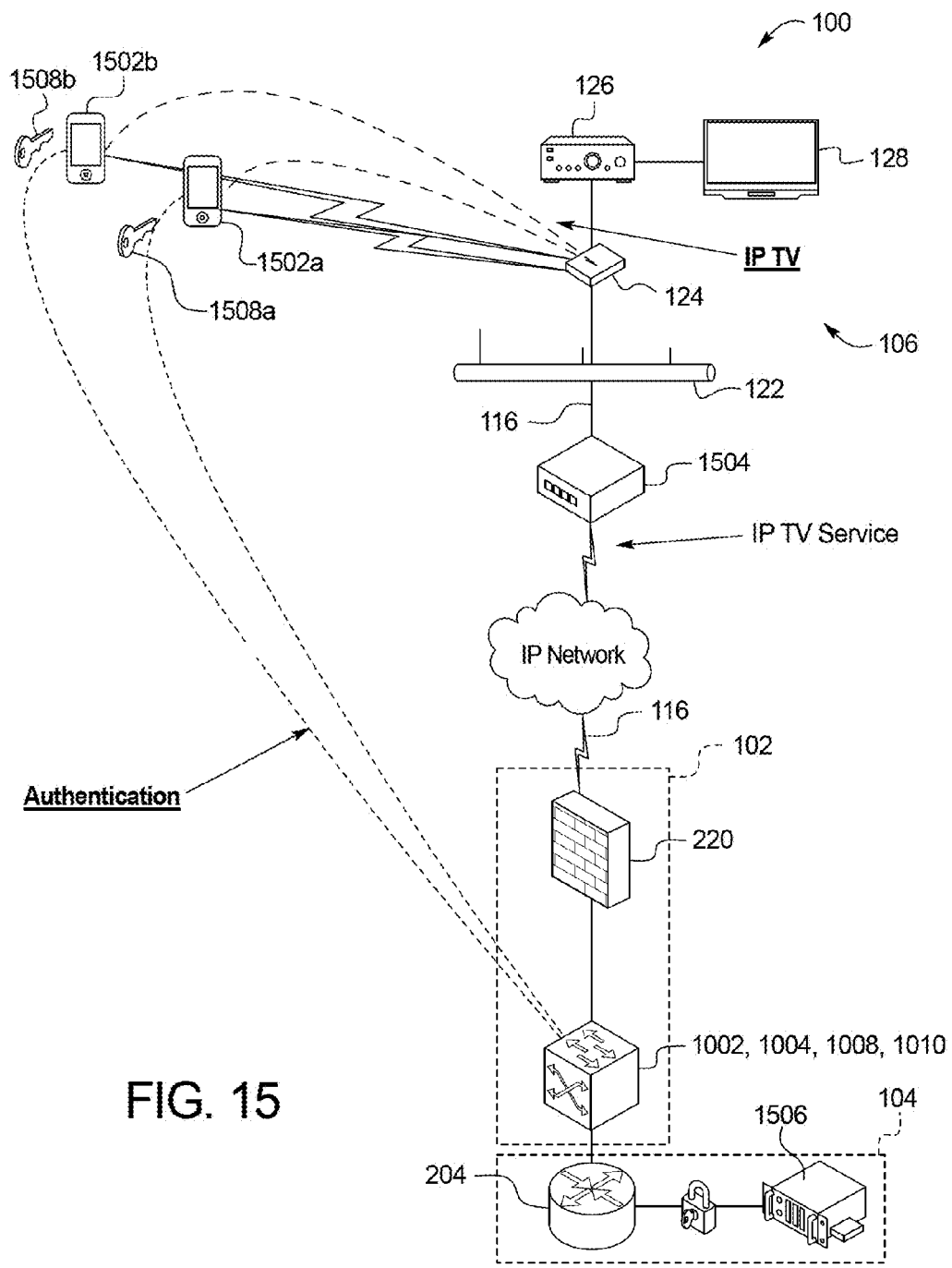
FIGS. 15 to 17 show diagrams of different embodiments of providing encrypted IP-based television service to mobile devices.
Figure 16:
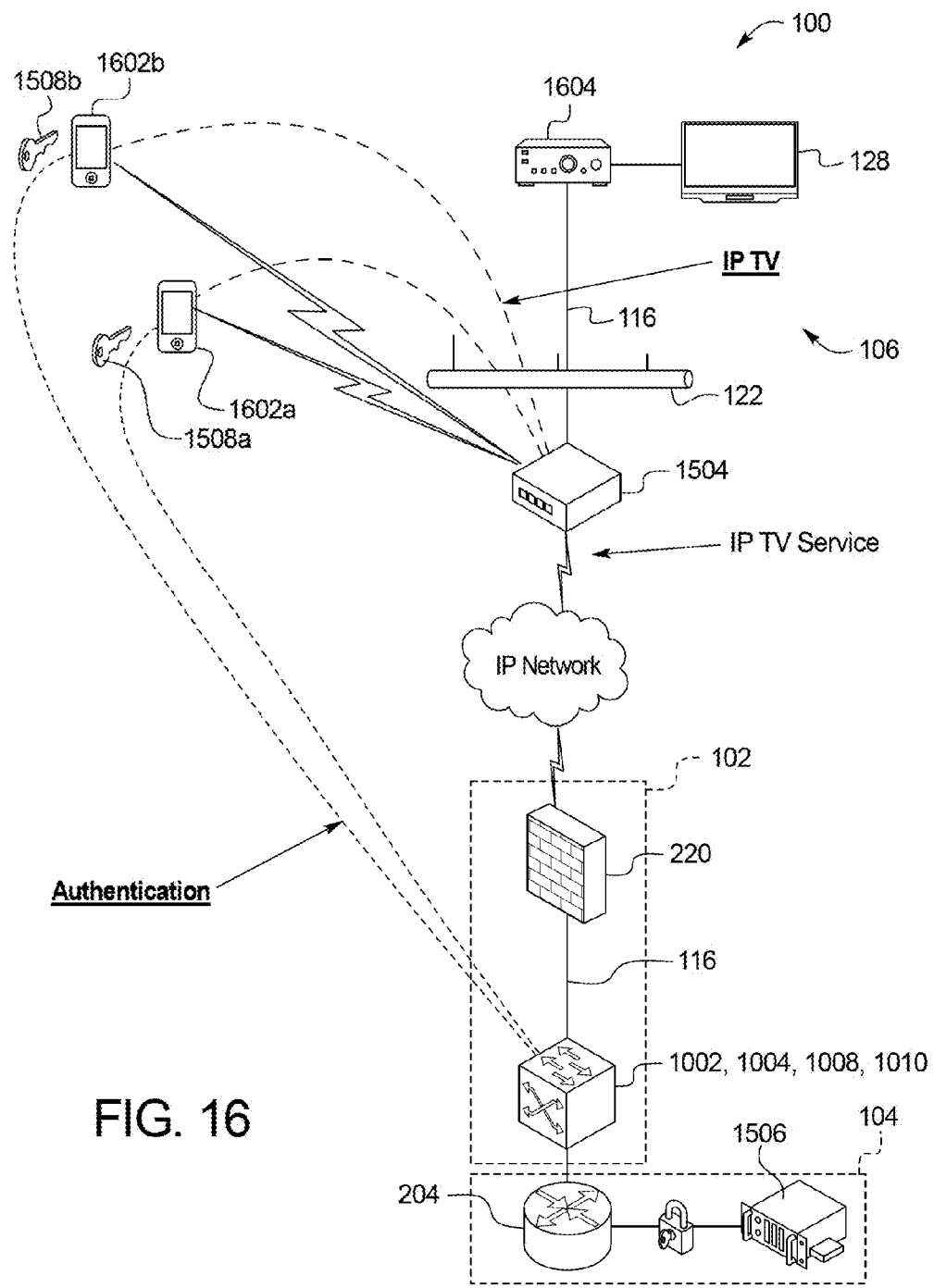
Figure 17:
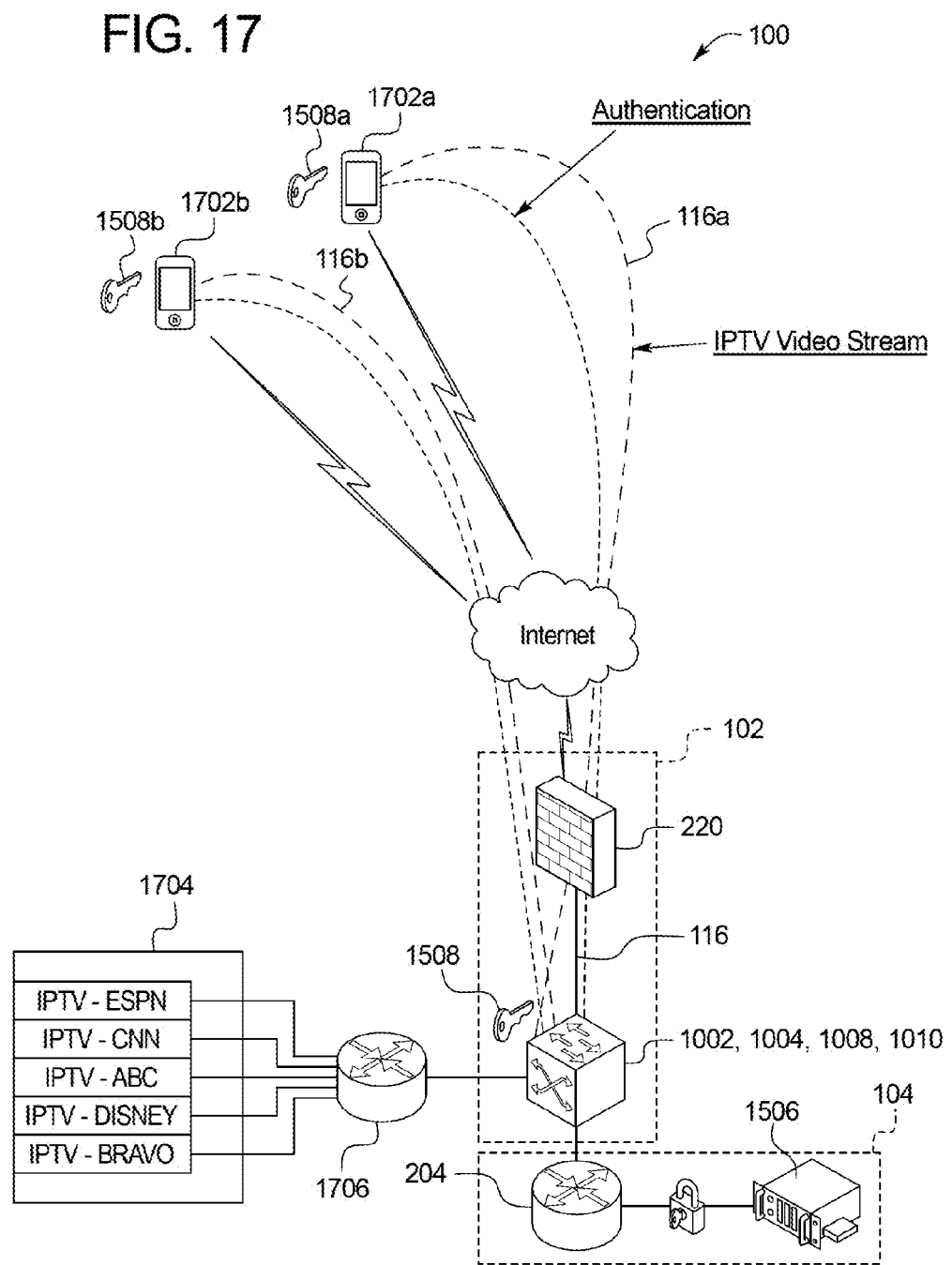

As discussed above, the content delivery network 102 provides encrypted IPTV service to a client network 106 that includes a display device 128 connected to a multimedia receiver 126 and a decryption processor 124. However, it should be appreciated that encrypted IPTV service can also be provided to mobile devices (e.g., smartphones, tablet computers, etc.). FIGS. 15 to 17 show diagrams of different embodiments of providing encrypted IPTV service to mobile devices.

FIG. 15 shows a diagram of the network communication system 100 of FIGS. 1 and 2 that includes the client network 106 receiving television service via the decryption processor 124. Similar to FIGS. 1 and 2, the decryption processor 124 is connected to a local network 122 that is connected to the Internet via a residential gateway 1504. The decryption processor 124 is configured to decrypt television service and encrypt requests from a consumer. As described in FIGS. 1 and 2, the decryption processor 124 provides decrypted television service to the multimedia receiver 126, which decodes the television service for display by the display device 128. In addition, the decryption processor 124 provides decrypted television service to mobile devices 1502, which include functionality of the receiver 126 and the display device 128 (e.g., the mobile devices 1502 decode and display the television service). Further, the mobile devices 1502 transmit requests for multicast and unicast programming to the decryption processor 124 for encryption and transmission via the VPN path 116 to the content delivery network 102.

In this embodiment, the decryption processor 124 includes wireless functionality that enables television service to be wirelessly transmitted to the mobile devices 1502. This wireless functionality also enables the mobile devices 1502 to transmit requests and any other information wirelessly to the decryption processor 124. The wireless functionality may be provided via, for example, WiFi, Bluetooth, or a WLAN. It should be appreciated that either of the mobile devices 1502 may not receive television service when they are located outside of a wireless transmission range of the decryption processor 124.

In this embodiment, the mobile devices 1502 are authenticated prior to being able to receive television service. This authentication ensures that only certain subscribing mobile devices have access to television service provided by a particular service provider. It should be noted that the mobile devices 1502 have to authenticate while the receiver 126 and/or the display device 128 do not authenticate because the receiver 126 is typically pre-authenticated with a decoding key by the television service provider prior to being sent to a consumer. However, the mobile devices 1502 are not typically provided or managed by television service providers. Thus, any decoding application or key provided by television service providers has to be transmitted to the mobile devices 1502. Otherwise, anyone with a mobile device 1502 could connect to the decryption processor 124 (or other networking components in other embodiments) and view television service.

To manage authentication of the mobile devices 1502, the service provider network 104 includes an authentication server 1506. FIG. 15 shows the authentication server 1506 communicatively coupled to provider switch 204. However, in other embodiments the authentication server 1506 may be located logically within other parts of the service provider network 104 including, for example, at a headend, datacenter, etc. Alternatively, the authentication server 1506 may be included within the content delivery network 102 (e.g., the VPN controller 1010 or the network manager 118).

The example authentication server 1506 manages which client devices 1502 are authorized to decode and display television service associated with a television service provider. The authentication server 1506 may include a data structure of device identifiers (e.g., MAC addresses, serial numbers, IP addresses (static or dynamic)) that correspond to authorized mobile devices 1502. The authentication server 1506 may authorize a mobile device 1502 through an authentication process (outside of the VPN path 116) in which a user of the mobile device 1502 provides credentials (e.g., a username and password) that corresponds to an already established subscription of IPTV service provided by the service provider and relayed by the content deliver network 102. In other instances, a consumer uses the mobile device 1502 to authenticate with the authentication server 1506 during a request for television service (e.g., at account creation).

As shown in FIG. 15, the mobile devices 1502 connect to the authentication server 1506 through the content delivery network 102. For instance, the VPN controller 1010 or the network manager 118 may manage authentication with the authentication server 1506. In some instances, the authentication server 1506 may provide the content delivery network 102 with an indication that certain mobile devices 1502 are authorized to receive television service via the VPN path 116. However, it should be appreciated that the authentication process can occur external to the VPN path 116 using, for example, 4G cellular networks, WiFi, WLAN, and/or any other type of connection to the content delivery network 102.

In an example, a user of the mobile device 1502a accesses a web page hosted by the authentication server 1506 and provides credentials. The authentication server 1506 validates the credentials and electronically transmits a decoding key 1508a that is specifically configured for the mobile device 1502a. The decoding key 1508a may also include any software needed to cause the mobile device 1502a to function as a receiver 126 (e.g., television channel selection, display of a user guide, ability to record programming, ability to display widgets, ability to process functions in conjunction with programming, etc.).

The authentication server 1506 may also transmit a message to the VPN controller 1010 (or the network manager 118) of the content delivery network 102 indicating that the mobile device 1502a is validated to receive television service for a consumer account associated with the decryption processor 124 of the client network 106. The message may cause the content delivery network 102 to provision a remote access point and VLAN separate for the mobile device 1502a. This separation enables the remote access point to receive multicast or unicast programming for the mobile device 1502a separate from a remote access point configured to receive programming for the receiver 126. The VLAN associated with the mobile device 1502a is routed to the same portion of the encryption controller 1008 that is used for the VPN path 116, thereby enabling the same VPN path 116 to be used for two different television service streams for the mobile device 1502a and the receiver 126.

After authenticating the mobile device 1502a, the content delivery network 102 configures the decryption processor 124 to enable the device 1502a to connect to the VPN path 116. For instance, the VPN controller 1010 may transmit one or more configuration messages to the decryption processor 124 including an identifier (e.g., a MAC address, serial number) of the mobile device 1502*a*. The decryption processor 124 uses the identifier to communicatively couple to the mobile device 1502*a*. The decryption processor 124 may then transmit television service to the mobile device 1502*a* in conjunction to providing television service to the receiver 126.

While the authentication process was described for the mobile device 1502*a*, it should be appreciated that the same process can be performed for the mobile device 1502*b*. However, a distinct decoding key 1504*b* is transmitted to the mobile device 1502*b*, thereby enabling the mobile devices 1502*a* and 1502*b* to concurrently receive different programming of the same television service from the same television service provider via the same decryption processor 124. For instance, the mobile device 1502*a* may receive a multicast television channel while the mobile device 1502*b* receives a unicast VoD.

FIG. 16 shows a diagram of the network communication system 100 of FIG. 15 in which mobile devices 1602 and multimedia receiver 1604 include functionality associated with the decryption processor 124. In other words, the decryption processor 124 is implemented as software within the receiver 1604 and the mobile devices 1602. As a result of this configuration, the VPN path 116 extends to the receiver 1604 and the mobile devices 1602.

In this embodiment, the gateway 1504 provides a wireless communication connection between the mobile devices 1602 and the VPN path 116 implemented over the Internet. The gateway 1504 also provides a wired communication connection between the receiver 1604 and the VPN path 116. In some instances, a wireless router included within the local network 122 provides the wireless communication connection.

As disclosed in conjunction with FIG. 2, the combination of the decryption processor 124 and the receiver 126 streamlines the amount of hardware that is deployed to the client network 106. In the context of the mobile devices 1602, a user downloads software (e.g., an application) from either the content delivery network 102 (via the network manager 118 or the VPN controller 1010) or the service provider network 104 (via the authentication server 1506 or other server) that provides decryption processor and receiver functionality. As a result of having decryption processor functionality, the mobile devices 1602 become the endpoints of the VPN path 116. In this embodiment, separate VPN paths 116 may be provisioned for each mobile device 1602 and the receiver 1604 because each device is a separate endpoint. However, in other embodiments, the encryption controller 1008 may use IP addressing so that only one VPN path 116 is used in conjunction with multiple device endpoints.

Similar to FIG. 15, each of the mobile devices 1602 of FIG. 16 authenticates with the authentication server 1506 via any available communication medium. The authentication server 1506 in response provides decoding keys 1508 for decoding television service. The authentication server 1506 also transmits one or more messages to the content delivery network 102 identifying the authorized mobile devices 1602. In response to these messages, the content delivery network 102 provisions remote access points 1002, VLANs, routers 1004, and the encryption processor 1008 for encrypting and streaming television service. The content delivery network 102 also establishes the VPN path 116 through the gateway 1504 to the authorized devices 1602 and 1604. At this point, each of the authorized devices 1602 and 1604 is capable of separately and concurrently streaming different multicast or unicast television service from the same television service provider.

FIG. 17 shows a diagram of the network communication system 100 of FIG. 15 in which mobile devices 1702 are configured to receive IP-based television service via respective VPN paths 116 operating over a wireless communication medium (e.g., 4G LTE, WiFi, etc.). In this embodiment, the encryption controller 1008 is configured to establish VPN paths 116 across wireless communication infrastructure to enable the mobile devices 1702 to receive television service from virtually any location within range of a cellular network.

Similar to FIG. 16, the mobile devices 1702 are authenticated by the authentication server 1506 before television service is streamed. To authenticate, each of the mobile devices 1702 transmits an authentication request through wireless communication channels to the authentication server 1506. In response, the authentication server 1506 requests for each mobile device 1702 to provide credentials or register. After successfully authenticating or registering, the authentication server 1506 transmits decoding keys 1508 to the mobile devices 1702 via the content delivery network 102. The VPN controller 1010 (and/or network manager 118) may store a copy of the decoding keys 1508 to provision and maintain VPN paths 116 to the mobile devices 1702. This enables the VPN controller 1010 to change which cellular or wireless infrastructure is provisioned for the VPN path 116 when the mobile devices 1702 move throughout a cellular or wireless network.

The configuration shown in FIG. 17 is also compatible with IP-based television service specifically configured for mobile devices. For instance, content providers 1704 may stream one or more individual channels of television programming that is configured for display on a mobile device. The example content delivery network 102 operates in conjunction with IPTV routers 1706 to select which channel is provided to which mobile device 1702. In can be appreciated that a mobile device 1702 has to be authenticated before the IPTV router 1706 will update a routing and forwarding table to transmit IPTV service. While the IPTV routers 1704 are shown as being separate from the content providers 1704, in other embodiments each content provider 1704 (or group of collectively owned content providers) may each have their own separate IPTV router 1706.

The mobile service provided by the content providers 1704 is similar to multicast television routing because the routers 1706 include routing and forwarding tables that specify to which destination IP address a particular channel is to be routed. However, the content delivery network 102 bypasses the use of remote access points because the content is not particular to any one television service provider. Instead, the content delivery network 102 configures internal VLANs from routers 1004 and 1006 to appropriate portions of the encryption controller 1008 to maintain a one-to-one correspondence between the content providers 1704 and the mobile devices 1702. The encryption controller 1008 associates each VLAN with the appropriate VPN path 116 to provide the mobile-based IPTV service to the appropriate mobile device 1702. Alternatively, the content delivery network 102 provisions a provider-side VPN path from the encryption controller 1008 to the appropriate IPTV router 1706.

In can be appreciated that in some embodiments, each content provider 1704 requires separate authentication. In these embodiments, a user of the mobile device 1702 authenticates each time a different content provider 1704 is accessed. Alternatively, the network manager 118 or the VPN controller 1010 may manage separate authentications for the mobile device 1702. For example, the network manager 118 may store a copy of authentication information associated with the mobile device 1702. When a content provider 1704 requests authentication before content can be provided, the network manager 118 transmits the authentication instead of having the user prompted for the information.

In an example, the mobile device 1702a requests to receive television service from the ESPN® content provider 1704. In response to the request, the content provider 1704 requests authentication (using, for example, the authentication server 1506 or another authentication server) from the mobile device 1702a. After receiving authentication via a decoding key 1508a, the content delivery network 102 configures an internal VLAN connected to a partitioned portion of encryption controller 1008 and provisions the VPN path 116a. The content delivery network 102 then requests that the router 1706 route the ESPN® television service to a destination IP address managed by the content delivery network 102. The content delivery network 102 then encrypts and routes the ESPN® television service to the VPN path 116a. The mobile device 1702a receives, decrypts, decodes, and displays the television service.

Some time later a user may select to view television service provided by the CNN content provider 1704. The content delivery network 102 decrypts and transmits the request to the IPTV router 1706. The content delivery network 102 may also provide authentication to the IPTV router 1706. In response, the IPTV router 1706 routes the CNN® television service to the IP address (e.g., an IP address assigned to a remote access point) of the content delivery network 102 specified in the received request. The content delivery network 102 then encrypts and transmits the CNN® television service as IPTV service to the mobile device 1702a via the VPN path 116a for display to a user.

Subscribing Consumer Authentication Embodiment

In some instances, television service providers 202 have legal and contractual obligations to content providers. These obligations specify that the service providers 202 are to provide television service on a one-to-one basis with authorized subscribing consumers. This ensures for the content providers that only designated subscribing consumers receive television service and prevents a single stream of television service from being provided to many different (oftentimes unauthorized) consumers.

Figure 18:
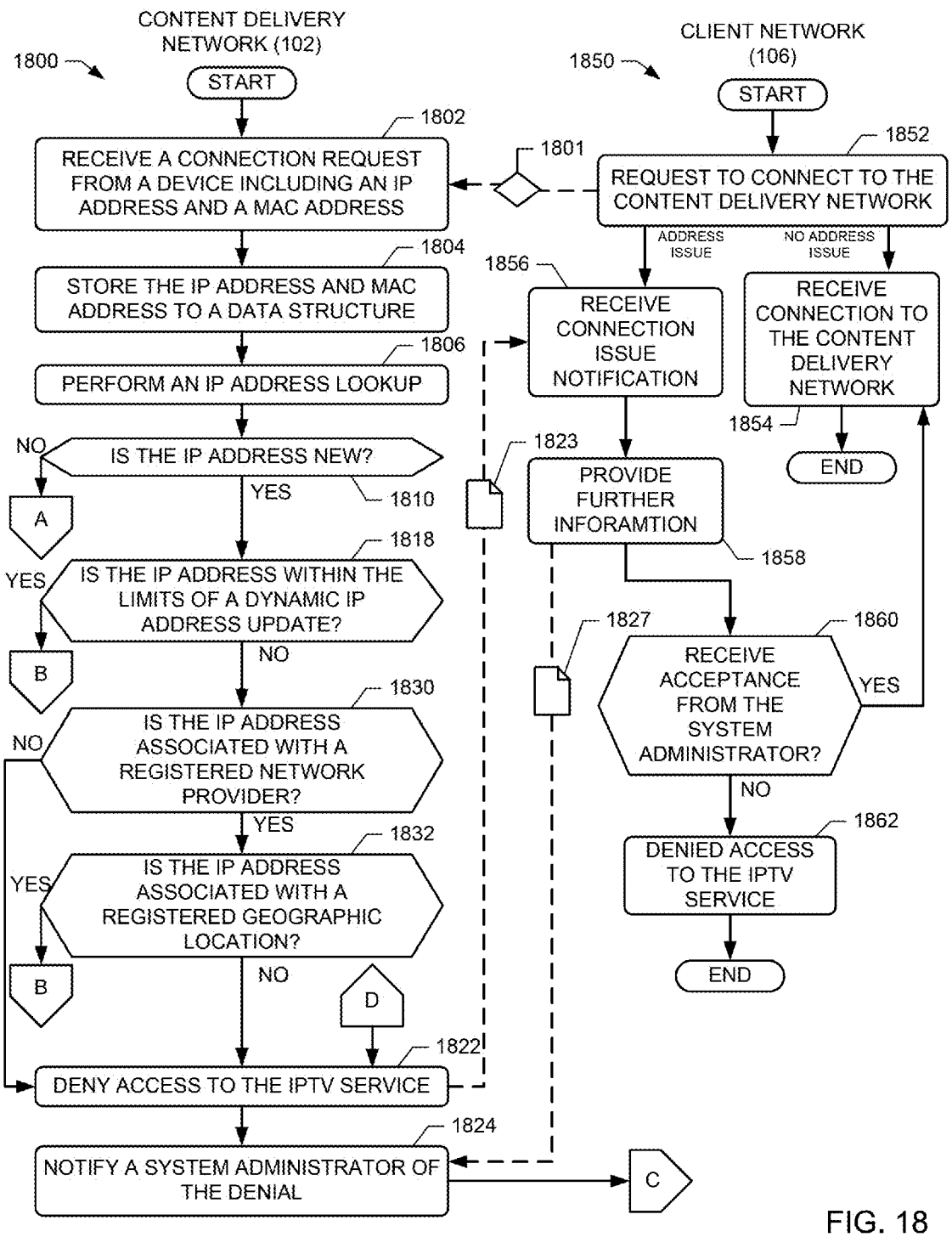
FIGS. 18 and 19 show a flow diagram illustrating example procedures to authenticate a consumer device that requests to receive IPTV service, according to an example embodiment of the present invention.
Figure 19:
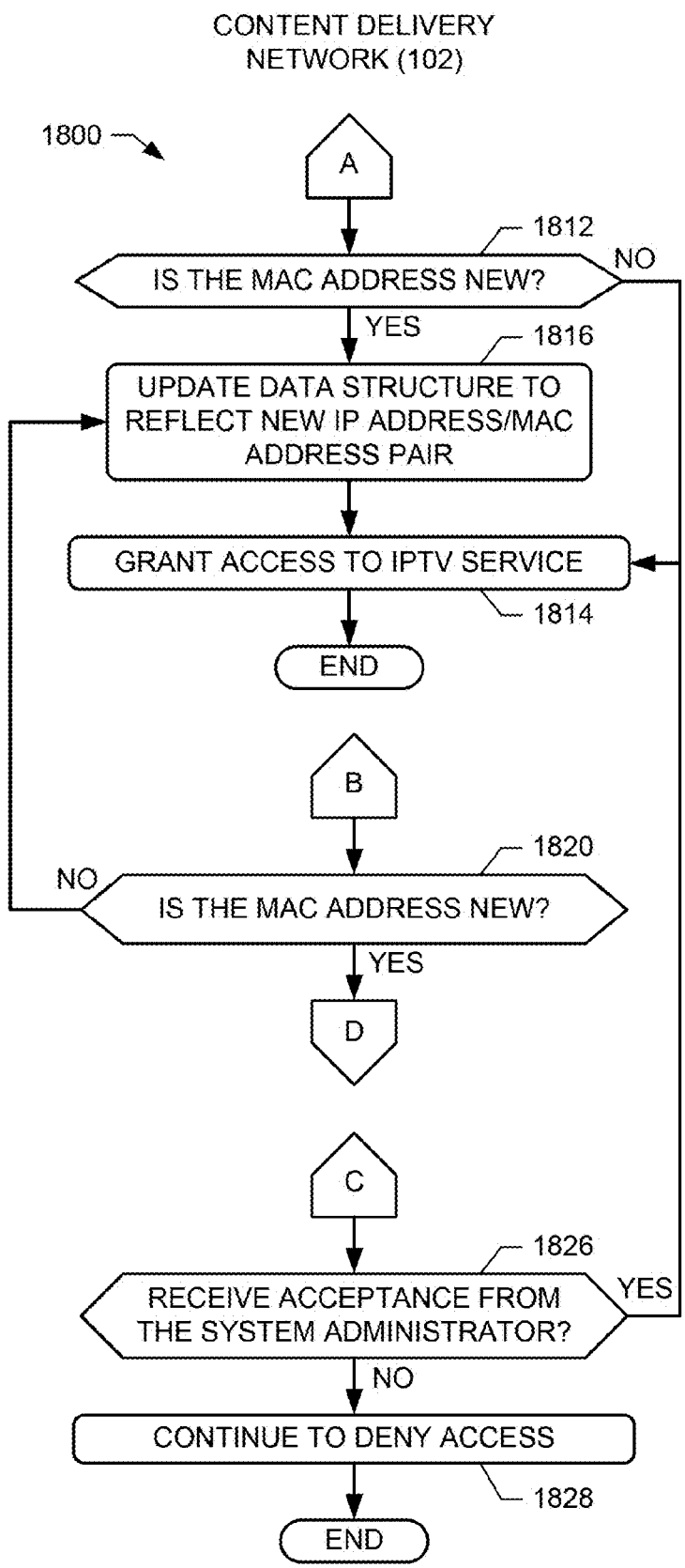

FIGS. 18 and 19 show a flow diagram illustrating example procedures 1800 and 1850 to authenticate a consumer device that requests to receive IPTV service, according to an example embodiment of the present invention. The example procedures 1800 and 1850 may be carried out by, for example, the content delivery network 102, the client network 106, the controllers 112, 1008, 1010, the network manager 118, the local network 122, the decryption processor 124, the receiver 126, and/or the display device 128, described in conjunction with FIGS. 1, 2, 4, 5, and 10 to 13. Although the procedures 1800 and 1850 are described with reference to the flow diagram illustrated in FIGS. 18 and 19, it will be appreciated that many other methods of performing the acts associated with the procedures 1800 and 1850 may be used. For example, the order of many of the blocks may be changed, certain blocks may be combined with other blocks, and many of the blocks described may be optional.

The procedure 1800 of FIG. 18 begins by the content delivery network 106 (e.g., the VPN controller 1010) receiving a connection request message 1801 from a device for IPTV service (block 1802). The device that transmits the connection request message 1801 can include, for example any one of the devices 124, 126, and 128 of the client network 106 based on the configuration of the device (e.g., smartphone, computer, television, etc.). The connection request message 1801 includes a MAC address assigned to the device and/or an IP address assigned to the network connectivity associated with the device. For example, the IP address may be assigned to the local network 122 and/or to the display device 128 (e.g., mobile device 1502, 1602, and 1702). In other embodiments a device identifier assigned by the content delivery network 102 may be used instead of and/or in conjunction with the MAC address.

The example content delivery network 102 stores the IP address and the MAC address to a data structure configured to manage VPN connectivity (block 1804). The content delivery network 102 (e.g., the network manager 118) performs an IP address lookup to determine whether the IP address is authorized to access the IPTV service (block 1806). For instance, the network manager 118 initially stores an IP address (and/or MAC address) of a consumer device when the consumer registers with the content delivery network 102. For each connection request, the content delivery network 102 compares the received IP address to the registered IP address to determine whether the requesting device is authorized to receive the IPTV service. Thus, if the content delivery network 102 determines that the IP address is the same as the registered IP address (block 1810), the content delivery network 102 determines whether the MAC address is new (block 1812). If the received MAC address matches the registered MAC address, the example content delivery network 102 establishes IPTV service for the requesting device (block 1814). For instance, the network manager 118 may instruct the VPN controller 1010 to establish a VPN path (e.g., transmitting a VPN connection request (not shown)) to the corresponding decryption processor 124 of the requesting device and begin streaming IPTV service. At this point, the example procedure 1800 ends. In other examples, the example procedure 1800 returns to block 1802 when a request is received from the same device and/or another consumer device.

Returning to block 1812, responsive to determining that the MAC address is new, the content delivery network 102 updates a data structure to reflect the new IP address/MAC pair (block 1816). The content delivery network 102 then provides access to the IPTV service (block 1816). In this instance, a consumer may be using a device different from the registered device to receive IPTV service. For example, a consumer may have registered for the IPTV service using a laptop but requests to stream IPTV service to a television connected to a receiver. In this example, both the laptop and the receiver are connected to a local network 122 that is assigned one IP address. As a result, any device that is connected to the local network 122 may stream the IPTV service because the IP address used by all of the devices is the same as the registered IP address.

Returning to block 1810, responsive to determining that the IP address is new, the content delivery network 102 determines whether the new IP address is authorized to receive IPTV service. For example, the content delivery network 102 determines whether the new IP address is within the limits of a dynamic IP address update (block 1818). To determine if the new IP address is within the limits, the content delivery network 102 uses IP addressing rules (or algorithms) provided by network service providers. Responsive to determining that the IP address is within the limits of a dynamic IP address update, the content delivery network 102 determines if the MAC address is new (block 1820). If the MAC address is not new, the content delivery network 102 performs the steps of blocks 1814 and 1816 to provide IPTV service. However, if the MAC address is new, the content delivery network 102 denies access to the IPTV service (block 1822).

The content delivery network 102 denies access to the IPTV service by sending a decline message 1823 to the requesting device. The content delivery network 102 may also send a message to the VPN controller 1010 that includes instructions to not create a VPN for the IP address/MAC address associated with the request. The content delivery network 102 further notifies a system administrator (e.g., personnel working in conjunction with the network manager 118) of the denial of service (block 1824). The content delivery network 102 may notify the system administrator via an e-mail, text message, alert message, etc.

The system administrator then determines whether to manually allow the requesting device to receive IPTV service (block 1826). For instance, the system administrator may use information 1827 provided by the requesting device or an associated consumer to determine whether to allow access. The information 1827 could include, for example, an e-mail or text message explaining (or documenting) why the IP address and/or MAC address has changed. The information 1827 could also include a phone call to the system administrator. Responsive to the system administrator allowing the connection, the content delivery network 102 provides IPTV service to the requesting device (block 1814). However, responsive to the system administrator not allowing the connection, the content delivery network 102 continues to deny the requesting device access to the IPTV service (block 1828). The example procedure 1800 then ends. Alternatively, the example procedure 1800 returns to block 1802 when a request is received from the same device and/or another consumer device.

Returning to block 1818, responsive to determining that the IP address is not within the limits of a dynamic IP address update, the content delivery network 102 then determines whether the new IP address is associated with a registered network provider (block 1830). In other words, the content delivery network 102 determines whether the new IP address is associated with the same network provider as the initially registered IP address. To determine which IP addresses are associated with network providers, the content delivery network 102 receives (or accesses) a published data structure of IP addresses for each network provider. If the network provider associated with the new IP address is different from the registered network provider, the content delivery network 102 denies access to the IPTV service (block 1822).

However, if the IP address is associated with a registered network provider, the content delivery network 102 determines whether the new IP address is associated with a registered geographic location (block 1832). In other words, the content delivery network 102 determines whether the requesting device is located in the same geographic location as the geographic location that was initially registered by the consumer. The content delivery network 102 uses IP address/geographic data lookup tables to determine the geographic location of the new IP address. Responsive to determining that the geographic location associated with the new IP address matches the registered geographic location, the content delivery network 102 determines whether the MAC address is new so as to determine whether to provide IPTV service (block 1820). However, responsive to determining that the geographic location associated with the new IP address does not match the registered geographic location, the content delivery network 102 denies access to the IPTV service (block 1822). At this point the consumer associated with the requesting device can provide more information 1827 to a system administrator to receive access to the television service. The system administrator may then deny or allow access to the IPTV service (blocks 1824 to 1828). These steps thereby provide precautions when a consumer moves a device to a new geographic location.

The example procedure 1850 begins when a device (e.g., any one of the devices 124, 126, and 128) of the client network 106 transmits a connection request message 1801 to receive IPTV service (block 1852). The device transmits the request message 1801 for any new IPTV session after a previous session of IPTV service has ended and the VPN controller 1010 has ended the VPN connection. In some embodiments, the device is configured to transmit the request message 1801 after a time period (e.g., every two days) and/or after detecting an IP address update. If there are no address issues (as determined by the content delivery network 102 described in conjunction with the procedure 1800), the device receives a VPN connection to establish a VPN path to the content delivery network 102 to receive streamed IPTV (block 1854). The example procedure then 1850 ends. Alternatively, the example procedure 1850 returns to block 1852 when a device at the client network 106 requests to connect to IPTV service.

However, if there is an issue with the IP address and/or the MAC address of the device, the device receives a decline message 1823 indicating that there is a connection issue (block 1856). In this embodiment, a consumer uses the device to provide further information 1827 to the content delivery network 102 (block 1858). As discussed above, the information 1827 can include documentation as to why the IP address is new and/or unregistered by the content delivery network 102.

The device at the client network 106 next determines whether acceptance to access IPTV service was provided by the system administrator (block 1860). The acceptance may be provided in a message transmitted by the content delivery network 102. In other embodiments, acceptance can include an indication that IPTV service will soon be transmitted to the client network 106. Responsive to determining that acceptance was provided, the client network 106 receives a VPN connection to access IPTV service (block 1854). However, if the system administrator does not provide acceptance, the client network 106 continues to be denied access to IPTV service (block 1862). The example procedure 1850 then ends. In other embodiments, the example procedure 1850 returns to block 1852 to transmit another request message 1801.

CONCLUSION

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which The invention is claimed as follows:

1. A method, comprising:
   receiving a subscription request in a content delivery network from a consumer to receive television service during a subscription period from a particular television service provider among a plurality of television service providers that each provide different respective television service;
   responsive to the subscription request, allocating, for the subscription period, for a client device associated with the consumer:
   i) a first remote access point in the content delivery network connected to a data feed from the requested particular television service provider, the first remote access point being previously configured to process encoded television service specifically from the requested particular television service provider; and
   ii) a portion of a controller connected to the first remote access point configured to encrypt a data stream carrying the encoded television service from the particular television service provider;
   provisioning a secure communication channel between the allocated portion of the controller and a decryption processor communicatively coupled to the client device;
   streaming the encrypted data stream carrying the television service from the particular television service provider to the client device via the secure communication channel;
   receiving a second subscription request from the consumer to subscribe to another television service provider;
   de-allocating the first remote access point for the consumer;
   allocating a second remote access point in the content delivery network connected to a data feed from the other television service provider, the second remote access point being previously configured to process encoded television service specifically from the other television service provider;
   configuring the portion of the controller to be connected to the second remote access point instead of the first remote access point to encrypt a data stream carrying the encoded television service from the other television service provider; and
   streaming the encrypted data stream carrying the television service from the other television service provider to the client device via the secure communication channel.

2. The method of claim 1, wherein an Internet service provider provides an Internet connection to the decryption processor for the secure communication channel, the Internet service provider being different than the particular television service provider.

3. The method of claim 1, wherein an Internet service provider provides an Internet connection to the decryption processor for the secure communication channel, the Internet service provider being the same entity as the particular television service provider.

4. The method of claim 1, wherein the television service includes at least one of multicast programming and unicast programming provided by the particular television service provider.

5. The method of claim 1, further comprising:
   receiving an encrypted request from the decryption processor for a multicast television channel;
   decrypting the request in the portion of the controller;
   transmitting the request to the first or the second remote access point;
   transmitting the request from the first or the second remote access point causing at least one device to route a stream of the multicast television channel to the first or the second remote access point;
   encrypting the received stream of the multicast television channel in the portion of the controller; and
   transmitting the encrypted stream to the decryption processor via the secure communication channel.

6. The method of claim 1, further comprising:
   receiving an encrypted request from the decryption processor for unicast programming;
   decrypting the request in the portion of the controller;
   transmitting the request to the first or the second remote access point;
   transmitting the request from the first or the second remote access point causing at least one multimedia publisher to stream the requested unicast content to the first or the second remote access point;
   encrypting the received stream of the unicast programming in the portion of the controller; and
   transmitting the encrypted stream of the unicast programming to the decryption processor via the secure communication channel.

7. The method of claim 1, further comprising:
   assigning the first or the second remote access point an IP address; and
   provisioning a virtual local area network between the first or the second remote access point and the portion of the controller.

8. The method of claim 1, further comprising:
   sending the decryption processor to a user of the client device in response to the subscription request for television service; and
   sending a multimedia receiver to the user in response to the subscription request for television service.

9. The method of claim 8, wherein the decryption processor and the multimedia receiver is transmitted electronically from the content delivery network to the client device.

10. An apparatus, comprising:
    a first remote access point configured to process television programming specifically from a data feed of a first related television service provider;
    a second remote access point configured to process television programming specifically from a data feed of a second related television service provider;
    a connection controller configured to:
      encrypt the television programming received from the first or the second remote access point; and
      transmit the encrypted television programming to a client device via a secure communication channel; and
    a management controller configured to:
      select the first remote access point specifically configured for the first related television service provider, among a plurality of remote access points specifically configured for different television service providers that each provide different respective television programming, based on a request from a consumer of the client device subscribing to the first related television service provider;

provision a virtual local area network between the first remote access point and the connection controller;

provision the secure communication channel from the connection controller to a decryption processor connected to the client device;

de-allocate the first remote access point for the consumer after receiving a second request from the consumer to subscribe to the second related television service provider;

select the second remote access point specifically configured for the second related requested television service provider; and provision a second virtual local area network between the second remote access point and the connection controller.

11. The apparatus of claim 10, wherein the secure communication channel includes a virtual private network.

12. The apparatus of claim 10, wherein first the remote access point is assigned an IP address by the first related television service provider and includes a physical interface to receive the television programming over the Internet.

13. The apparatus of claim 10, wherein the first remote access point is a virtual remote access point that is included within a portion of a server that is specifically configured for the first related television service provider.

14. The apparatus of claim 10, wherein the first remote access point is a virtual routing and forwarding ("VRF") router that includes an instance of a routing and forwarding table corresponding to the data feed from the first related television service provider and the virtual local area network.

15. The apparatus of claim 10, wherein the first remote access point is included within a television service provider network of the first related television service provider in logical proximity to a headend.

16. The apparatus of claim 10, wherein the connection controller is configured to encrypt the television programming over encoding of the television programming provided by the first related television service provider.

17. A system, comprising:
an Internet Protocol television network configured to provide encoded multicast programming and unicast programming, the Internet Protocol television network being among at least two television networks that each provide at least a portion of different respective multicast programming and unicast programming;

a content delivery network controller communicatively coupled to the Internet Protocol television network configured to:
receive a subscription request from a consumer to receive content from the Internet Protocol television network during a subscription period;
provision a remote access point to receive the content from the Internet Protocol television network, the remote access point being configured to process content specifically from the requested Internet Protocol television network;
encrypt a data stream carrying the multicast and unicast programming received from the Internet Protocol television network;
transmit the encrypted data stream carrying the programming to the consumer via a secure communication channel;
receive a second subscription request from the consumer to receive content from the other television network during a second subscription period;
de-allocate the remote access point after receiving the second subscription request;
provision a second remote access point to receive the content from the other television network;
encrypt a second data stream carrying the multicast and unicast programming received from the other television network; and
transmit the second encrypted data stream carrying the programming to the consumer via the secure communication channel; and a client network associated with the consumer and communicatively coupled to the content delivery network controller via the secure communication channel, the client network including:
a decryption processor configured to decrypt the data stream or the second data stream carrying the programming;
a receiver configured to decode the programming; and
a display device configured to visually and audibly present the programming to the consumer.

18. The system of claim 17, wherein the decryption processor and receiver are included within the display device.

19. The system of claim 18, further comprising an authentication server configured to authenticate the display device prior to the display device being able to connect to the secure communication channel.

20. The system of claim 17, wherein the client network includes a mobile network that enables the display device to receive the programming at any physical location within range of the mobile network.

21. The system of claim 20, wherein the decryption processor, receiver, and the display device are included within a mobile presentation unit.

22. The system of claim 18, further comprising a monitoring server configured to:
monitor usage of the programming; and
report the usage to an operator of the Internet Protocol television network.

23. The method of claim 1, further comprising individually addressing the first remote access point to receive the encoded television service from the particular television service provider.

24. The method of claim 1, wherein the subscription period includes an ongoing subscription until the consumer requests not to receive the television service from the requested particular television service provider.

* * * * *